(12) United States Patent
Kasai et al.

(10) Patent No.: US 7,842,227 B2
(45) Date of Patent: Nov. 30, 2010

(54) DRYING JIG, DRYING METHOD OF HONEYCOMB MOLDED BODY, AND MANUFACTURING METHOD OF HONEYCOMB STRUCTURED BODY

(75) Inventors: Kenichiro Kasai, Gifu (JP); Kazuya Naruse, Courtenay (FR)

(73) Assignee: Ibiden Co., Ltd., Gifu (JP)

( * ) Notice: Subject to any disclaimer, the term of this patent is extended or adjusted under 35 U.S.C. 154(b) by 499 days.

(21) Appl. No.: 11/711,021

(22) Filed: Feb. 27, 2007

(65) Prior Publication Data

US 2009/0079111 A1   Mar. 26, 2009

(30) Foreign Application Priority Data

Feb. 28, 2006 (EP) .................................. 06110528

(51) Int. Cl.
*F27D 5/00* (2006.01)
*C04B 33/30* (2006.01)

(52) U.S. Cl. ..................... 264/605; 264/630; 432/6; 432/258

(58) Field of Classification Search ......... 264/605–608, 264/630, 631; 432/6, 258
See application file for complete search history.

(56) References Cited

U.S. PATENT DOCUMENTS

| | | | |
|---|---|---|---|
| 2,248,389 A | | 7/1941 | Sanders et al. |
| 4,564,489 A | * | 1/1986 | Welzen et al. ............... 264/607 |
| 5,106,295 A | | 4/1992 | Misawa |
| 5,914,187 A | | 6/1999 | Naruse et al. |
| 6,669,751 B1 | | 12/2003 | Ohno et al. |
| 7,112,233 B2 | | 9/2006 | Ohno et al. |
| 7,309,370 B2 | | 12/2007 | Kudo et al. |
| 7,332,014 B2 | | 2/2008 | Ono et al. |
| 7,341,614 B2 | | 3/2008 | Hayashi et al. |
| 7,348,049 B2 | | 3/2008 | Yoshida |
| 7,387,829 B2 | | 6/2008 | Ohno et al. |
| 7,393,376 B2 | | 7/2008 | Taoka et al. |
| 7,396,586 B2 | | 7/2008 | Ohno et al. |
| 7,427,308 B2 | | 9/2008 | Taoka et al. |
| 7,427,309 B2 | | 9/2008 | Ohno et al. |
| 7,438,967 B2 | | 10/2008 | Fujita |
| 7,449,427 B2 | | 11/2008 | Ohno |

(Continued)

FOREIGN PATENT DOCUMENTS

DE 330006 12/1920

(Continued)

OTHER PUBLICATIONS

U.S. Appl. No. 11/711,021.

(Continued)

*Primary Examiner*—Richard Crispino
*Assistant Examiner*—Erin Snelting
(74) *Attorney, Agent, or Firm*—Finnegan, Henderson, Farabow, Garrett & Dunner, LLP

(57) ABSTRACT

A drying jig of the present invention is a drying jig for a pillar-shaped honeycomb molded body having a large number of cells longitudinally placed in parallel with one another with a cell wall therebetween, comprising: a fixing member for preventing separation or opening of the drying jig; and a piling member which enables the drying jig to be piled up in multi stage at the time of drying.

22 Claims, 6 Drawing Sheets

U.S. PATENT DOCUMENTS

| | | |
|---|---|---|
| 7,462,216 B2 | 12/2008 | Kunieda et al. |
| 7,473,465 B2 | 1/2009 | Ohno et al. |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029897 A1 | 2/2006 | Saijo et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamanura et al. |
| 2007/0152382 A1 | 7/2007 | Yamada et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0202455 A1 | 8/2007 | Saijo et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0293392 A1 | 12/2007 | Ohno et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0115597 A1 | 5/2008 | Ohno et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237428 A1 | 10/2008 | Kobayashi et al. |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |

FOREIGN PATENT DOCUMENTS

| | | |
|---|---|---|
| DE | 3914509 | 1/1991 |
| EP | 0018286 | 10/1980 |
| EP | 0212598 | 3/1987 |
| EP | 1 491 307 A1 | 12/2004 |
| EP | 1 500 481 A1 | 1/2005 |
| FR | 2441142 | 6/1980 |
| FR | 2587980 | 4/1987 |
| GB | 2183805 A * | 6/1987 |
| GB | 2 232 235 | 12/1990 |
| JP | 2001/019533 | 1/2001 |
| JP | 2001/130973 | 5/2001 |
| JP | 2005-119886 | 5/2005 |
| WO | WO 2005/054765 A1 | 6/2005 |

OTHER PUBLICATIONS

U.S. Appl. No. 11/951,949.

Kawai et al.; "Cutting Apparatus, Honeycomb Molded Body Cutting Method, and Honeycomb Structure Manufacturing Method", U.S. Appl. No. 11/513,115, filed Aug. 31, 2006.

Kawai et al.; "End Face Processing Apparatus, End Face Processing System, End Face Processing Method for Honeycomb Molded Body, and Manufacturing Method for Honeycomb Structure", U.S. Appl. No. 11/546,417, filed Oct. 12, 2006.

Saijo; "Manufacturing Method of Honeycomb Structured Body", U.S. Appl. No. 11/704,189, filed Feb. 9, 2007.

* cited by examiner

A-A Line cross-sectional view

DRYING JIG, DRYING METHOD OF HONEYCOMB MOLDED BODY, AND MANUFACTURING METHOD OF HONEYCOMB STRUCTURED BODY

CROSS-REFERENCE TO RELATED APPLICATIONS

This application claims priority of EP 06110528.4 filed on Feb. 28, 2006. The contents of this application are incorporated herein by reference in their entirety.

BACKGROUND OF THE INVENTION

1. Field of the Invention

The present invention relates to a drying jig, a drying method of a honeycomb molded body, and a manufacturing method of a honeycomb structured body.

2. Discussion of the Background

Recently, it becomes a problem that particulates such as soot, contained in exhaust gas emitted from internal combustion engines for vehicles such as a bus, a truck and the like, construction equipment and the like, do harm to the environment or the human health.

In order to solve this problem, there are proposed various filters using a honeycomb structured body made of porous ceramic as a filter for collecting particulates in exhaust gas and purifying the exhaust gas.

When a honeycomb structured body is manufactured by a conventional manufacturing method, first, a wet mixture is prepared by mixing, for example, two kinds of inorganic powders having different average particle diameters, a binder, a dispersion medium and the like. Then, this wet mixture is further mixed using a screw mixer or the like, and furthermore, the mixture was continuously extrusion-molded with a die. A molded body thus extruded is cut to a predetermined length to prepare a rectangular pillar-shaped honeycomb molded body.

Next, the obtained honeycomb molded body in a wet state is dried by use of microwave drying or hot air drying to manufacture a dried body of a honeycomb molded body which has certain strength and is easily handled.

After this drying process, by sealing an end of the specified cell, a cell of the honeycomb molded body is processed into a state in which either its ends is sealed with the plug material layer. Thereafter, the honeycomb molded body is degreased at the temperature of at least about 400° C. and at most about 650° C. in an oxygen-containing atmosphere to volatilize a solvent in organic binder components and decompose/dissipate resin components. Further, the honeycomb molded body is fired at the temperature of at least about 2000° C. and at most about 2200° C. in an inert gas atmosphere to manufacture a honeycomb fired body.

Then, by applying a sealing material paste to the side of the honeycomb fired body and bonding the honeycomb fired bodies to one another, an aggregated body of the honeycomb fired bodies in a state in which a large number of honeycomb fired bodies are bound to one another through a sealing material layer (adhesive layer) is prepared. Next, a honeycomb block is formed by cutting the obtained aggregated body of the honeycomb fired bodies into a predetermined shape such as a cylindrical pillar, a cylindroid and the like using a cutting machine and the like. Finally, a sealing material layer (coat layer) is formed by applying a sealing material paste to the periphery of the honeycomb block to complete the manufacturing of a honeycomb structured body.

In such a manufacturing method of the honeycomb structured body, a process in which drying treatment is applied to the honeycomb molded body prepared by extrusion molding, is required. Conventionally, a wet honeycomb molded body was sent in a dryer of a predetermined temperature and dried for a predetermined period of time and then taken out of the dryer.

JP-A 2001-130973 discloses a drying method of a ceramic molded body in which a drying jig comprising an upper jig and a lower jig, provided with means for applying pressure, is used and the ceramic molded body is surrounded in an adhered state from above and below with this drying jig and the ceramic molded body is dried while applying pressure thereto.

Further, JP-A 2001-130973 describes that in a process for drying a ceramic molded body, the overall ceramic molded body can be uniformly and rapidly dried without causing deformation such as warpage and the like in the ceramic molded body.

The contents of JP-A 2001-130973 are incorporated herein by reference in their entirety.

SUMMARY OF THE INVENTION

A drying jig of the present invention is a drying jig for a pillar-shaped honeycomb molded body having a large number of cells longitudinally placed in parallel with one another with a cell wall therebetween, comprising: a fixing member for preventing separation or opening of the drying jig; and a piling member which enables the drying jig to be piled up in multi stage at the time of drying.

Desirably, the drying jig further comprises two separable jig members or one jig member which is openable and closable.

Desirably, the piling member is disposed at both the upper side and the lower side of the drying jig, and one piling member has a convex shape and another piling member has a concave shape which can be fitted in the convex shape.

Desirably, the above-mentioned drying jig further comprises an upper jig and a lower jig, the fixing member provided on the upper jig.

Further, desirably, the above-mentioned drying jig comprises a material selected from a group consisting of epoxy resin, polycarbonate, polystyrene, polyethylene terephthalate, polyamideimide, and polyphenylene sulfide.

The drying jig desirably further comprises an upper jig and a lower jig; and an elastic member capable of absorbing a water content, the elastic member interposed between the honeycomb molded body and the upper jig and/or the lower jig upon holding of the honeycomb molded body by the drying jig.

In the drying jig, the piling member is desirably provided on the lower side of the drying jig, and a concave portion is desirably formed on the bottom side of the piling member.

Further, in the drying jig, the piling member desirably has a supporting member provided in a vertically downward direction from the lower side face of the drying jig.

Desirably, the drying jig has such a configuration that the shape of the honeycomb molded body is a square pillar shape, and the honeycomb molded body can be held so that the longitudinal direction of the honeycomb molded body is held in the horizontal direction while the opposite angles of the square shape in the cross-section perpendicular to the longitudinal direction of the honeycomb molded body are located on the same vertical line.

A drying method of a honeycomb molded body of the present invention is a drying method of a honeycomb molded body comprising: drying a honeycomb molded body after surrounding, in an adhered state with a drying jig, nearly the whole surface of a side face parallel to the longitudinal direction of a pillar-shaped honeycomb molded body having a large number of cells longitudinally placed in parallel with one another with a cell wall therebetween, wherein the drying jig comprises a fixing member for preventing separation or opening of the drying jig, and a piling member which enables the drying jig to be piled up in multi stage at the time of drying, preventing separation or opening of the drying jig by adjusting the fixing member after surrounding the honeycomb molded body with the drying jig, and thereafter piling up in multi stage through the piling member, the honeycomb molded body under a surrounded state by the drying jig, passing the honeycomb molded body inside a dryer for a predetermined period of time, so that the honeycomb molded body is dried.

Desirably, in the drying method of a honeycomb molded body, the drying jig further comprises two separable jig members or one jig member which is openable and closable.

Desirably, in the drying method of a honeycomb molded body, the piling member is disposed at both the upper side and the lower side of the drying jig, and one piling member has a convex shape and another piling member has a concave shape which can be fitted in the convex shape.

In the drying method of a honeycomb molded body, desirably, the drying jig further comprises an upper jig and a lower jig, and the fixing member is provided on the upper jig.

Further, in the drying method of a honeycomb molded body, desirably, the drying jig comprises a material selected from a group consisting of epoxy resin, polycarbonate, polystyrene, polyethylene terephthalate, polyamideimide, and polyphenylene sulfide.

In the drying method of a honeycomb molded body, desirably, the drying jig further comprises an upper jig and a lower jig; and an elastic member capable of absorbing a water content, the elastic member interposed between the honeycomb molded body and the upper jig and/or the lower jig when the honeycomb molded body is under the surrounded state by the drying jig.

In the drying method of a honeycomb molded body, the piling member is desirably provided on the lower side of the drying jig, and a concave portion is desirably formed on the bottom side of the piling member.

Further, in the drying method of a honeycomb molded body, the piling member desirably has a supporting member provided in a vertically downward direction from the lower side face of the drying jig.

In the drying method of a honeycomb molded body of the present invention, desirably, the shape of the honeycomb molded body is a square pillar shape, and drying is carried out under a state in which the honeycomb molded body is held in the drying jig such that the longitudinal direction of the honeycomb molded body is held in the horizontal direction while the opposite angles of the square shape in the cross-section perpendicular to the longitudinal direction of the honeycomb molded body are located on the same vertical line.

Desirably, the drying method of a honeycomb molded body further comprises microwave drying on the honeycomb molded body, before surrounding the honeycomb molded body with the drying jig.

A manufacturing method of a honeycomb structured body of the present invention is a manufacturing method of a honeycomb structured body comprising: manufacturing a pillar-shaped honeycomb molded body having a large number of cells longitudinally placed in parallel with one another with a cell wall therebetween, by molding a ceramic material; drying the honeycomb molded body after surrounding, in an adhered state with a drying jig, nearly the whole surface of a side face parallel to the longitudinal direction of the honeycomb molded body; and firing the honeycomb molded body to manufacture a honeycomb structured body comprising a honeycomb fired body, wherein the drying jig comprises a fixing member for preventing separation or opening of the drying jig, and a piling member which enables the drying jig to be piled up in multi stage at the time of drying, and in the drying of the honeycomb molded body, after surrounding the honeycomb molded body with the drying jig, separation or opening of the drying jig is prevented by adjusting the fixing member, and the honeycomb molded body under a surrounded state by the drying jig is piled up in multi stage through the piling member thereafter, drying the honeycomb molded body by passing the honeycomb molded body inside a dryer for a predetermined period of time.

In the manufacturing method of a honeycomb structured body, desirably, the drying jig further comprises two separable jig members or one jig member which is openable and closable.

In the manufacturing method of a honeycomb structured body, desirably, the piling member is disposed at both the upper side and the lower side of the drying jig, and one piling member has a convex shape and another piling member has a concave shape which can be fitted in the convex shape.

In the manufacturing method of a honeycomb structured body, desirably, the drying jig further comprises an upper jig and a lower jig, and the fixing member is provided on the upper jig.

Further, in the manufacturing method of a honeycomb structured body, desirably, the drying jig comprises a material selected from a group consisting of epoxy resin, polycarbonate, polystyrene, polyethylene terephthalate, polyamideimide, and polyphenylene sulfide.

In the manufacturing method of a honeycomb structured body, desirably, the drying jig further comprises an upper jig and a lower jig; and an elastic member which can absorb a water content, the elastic member interposed between the honeycomb molded body and the upper jig and/or the lower jig when the honeycomb molded body is under the surrounded state by the drying jig.

In the manufacturing method of a honeycomb structured body, the piling member is desirably provided on the lower side of the drying jig, and a concave portion is desirably formed on the bottom side of the piling member.

Further, in the manufacturing method of a honeycomb structured body, the piling member desirably has a supporting member provided in a vertically downward direction from the lower side face of the drying jig.

In the manufacturing method of a honeycomb structured body of the present invention, desirably, the shape of the honeycomb molded body is a square pillar shape, and drying is carried out under a state in which the honeycomb molded body is held in the drying jig such that the longitudinal direction of the honeycomb molded body is held in the horizontal direction while the opposite angles of the square shape in the cross-section perpendicular to the longitudinal direction of the honeycomb molded body are located on the same vertical line.

Desirably, the manufacturing method of a honeycomb structured body further comprises microwave drying on the honeycomb molded body, before surrounding the honeycomb molded body with the drying jig.

In the manufacturing method of a honeycomb structured body, the honeycomb structured body desirably has a structure in which a plurality of honeycomb fired bodies are bound to one another by interposing a sealing material layer, or the honeycomb structured body desirably comprises one honeycomb fired body.

DESCRIPTION OF THE EMBODIMENTS

Figure 1:
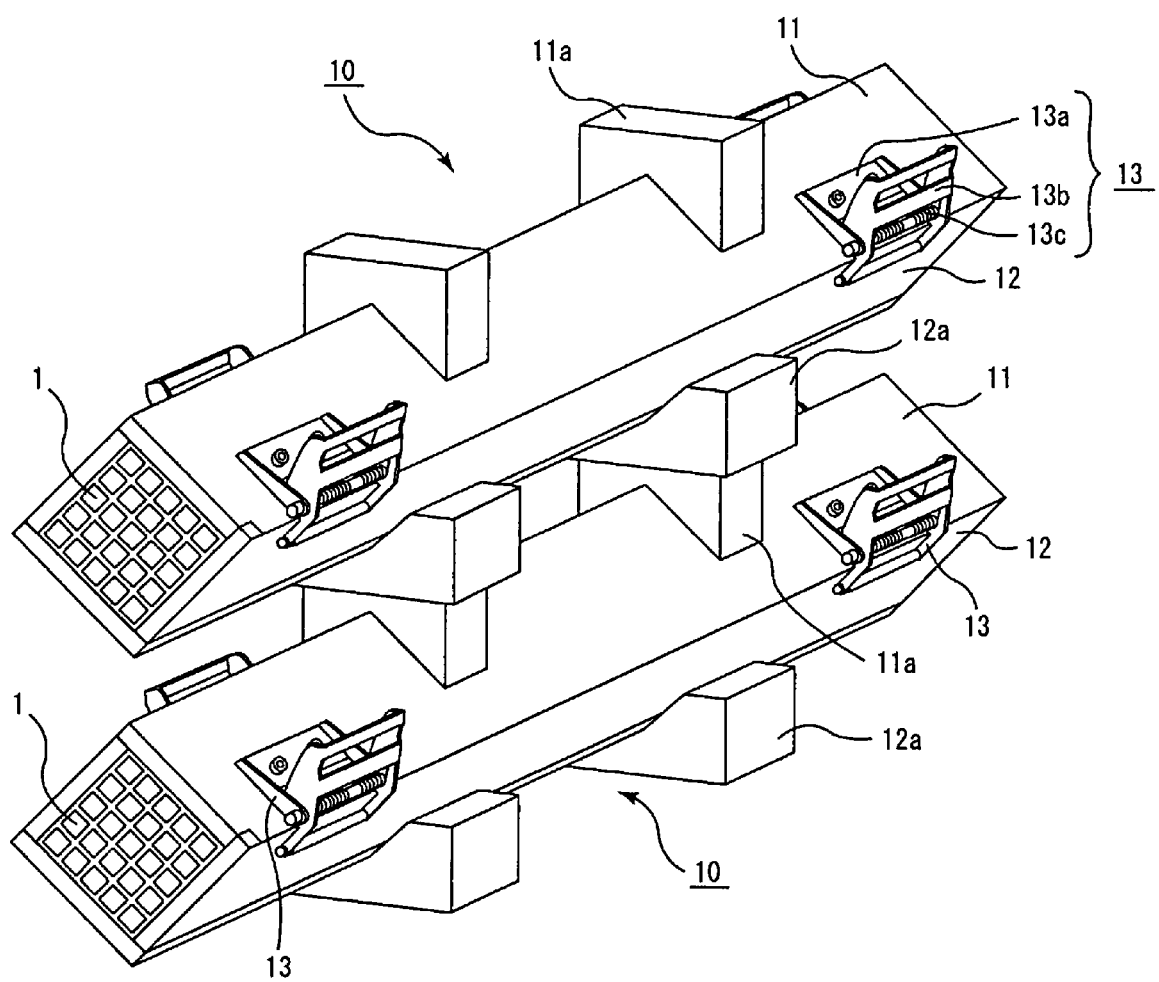
FIG. 1 is a perspective view schematically showing a mode in which two drying jigs according to the embodiments of the present invention are piled up.

A drying jig according to the embodiments of the present invention is a drying jig for a pillar-shaped honeycomb molded body having a large number of cells longitudinally placed in parallel with one another with a cell wall therebetween, comprising: a fixing member for preventing separation or opening of the drying jig; and a piling member which enables the drying jig to be piled up in multi stage at the time of drying.

Desirably, the drying jig further comprises two separable jig members or one jig member which is openable and closable.

In the present description, the former type of the drying jig is referred to as a separate type and the latter type is referred to as an open type.

Since the drying jig according to the embodiments of the present invention is provided with the fixing member for preventing separation or opening of the drying jig, and the piling member which enables the drying jig to be piled up at the time of drying, it becomes easier to pile up the drying jig with reliability and stability and to prevent the occurrence of the displacement of the drying jig at the time of drying.

Further, since it becomes easier to carry out spatial and overall drying on the honeycomb molded body by piling the drying jig in multi stage, it becomes easier to inhibit variations in the dried state after drying.

In addition, by piling up the drying jig in multi stage and spatially, it becomes easier to realize space saving and to utilize limited space effectively. Further, it becomes easier to dry the drying jig holding the honeycomb molded body while conveying it with a belt conveyor and the like, thereby making it easier to realize the automation and the downsizing of a manufacturing line.

Further, on the occasion of holding the honeycomb molded body, either of a separate type or an open type can be selected as a form of a drying jig. Accordingly, the drying jig of the present invention has a high degree of design flexibility in design of a manufacturing process, and it becomes easier to realize an efficient manufacturing process, together with the above-mentioned automation and downsizing of a manufacturing process.

A drying method of a honeycomb molded body according to the embodiments of the present invention is a drying method of a honeycomb molded body comprising: drying a honeycomb molded body after surrounding, in an adhered state with a drying jig, nearly the whole surface of a side face parallel to the longitudinal direction of a pillar-shaped honeycomb molded body having a large number of cells longitudinally placed in parallel with one another with a cell wall therebetween, wherein the drying jig comprises a fixing member for preventing separation or opening of the drying jig, and a piling member which enables the drying jig to be piled up in multi stage at the time of drying, preventing separation or opening of the drying jig by adjusting the fixing member after surrounding the honeycomb molded body with the drying jig, and thereafter piling up in multi stage through the piling member, the honeycomb molded body under a surrounded state by the drying jig, passing the honeycomb molded body inside a dryer for a predetermined period of time, so that the honeycomb molded body is dried.

In the drying method of a honeycomb molded body according to the embodiments of the present invention, since the honeycomb molded body is mechanically fixed from the surroundings and is fastened so as to have difficulty in changing its shape, by use of the drying jig, it becomes easier to dry the honeycomb molded body to a state of containing little water content without causing warpage to the honeycomb molded body. Also in the drying method of a honeycomb molded body according to the embodiments of the present invention, since the drying jig is provided with a piling member, it becomes easier to dry the honeycomb molded body efficiently in a state in which the drying jig under a state of surrounding the honeycomb molded body is piled up in multi stage.

A manufacturing method of a honeycomb structured body according to the embodiments of the present invention is a manufacturing method of a honeycomb structured body comprising: manufacturing a pillar-shaped honeycomb molded body having a large number of cells longitudinally placed in parallel with one another with a cell wall therebetween, by molding a ceramic material; drying the honeycomb molded body after surrounding, in an adhered state with a drying jig, nearly the whole surface of a side face parallel to the longitudinal direction of the honeycomb molded body; and firing said honeycomb molded body to manufacture a honeycomb structured body comprising a honeycomb fired body, wherein the drying jig comprises a fixing member for preventing separation or opening of the drying jig, and a piling member which enables the drying jig to be piled up in multi stage at the time of drying, and in the drying of the honeycomb molded body, after surrounding the honeycomb molded body with the drying jig, separation or opening of the drying jig is prevented by adjusting the fixing member, and the honeycomb molded body under a surrounded state by the drying jig is piled up in multi stage through the piling member thereafter, drying the honeycomb molded body by passing the honeycomb molded body inside a dryer for a predetermined period of time.

In the manufacturing method of a honeycomb structured body according to the embodiments of the present invention, since the honeycomb structured body is manufactured by using the dried honeycomb molded body while surely inhibiting the warpage produced at the time of drying by bringing the drying jig into intimate contact with the honeycomb molded body, it becomes easier to prevent product losses due to drying, and also to prevent the deterioration of the exhaust gas purifying property in the honeycomb structured body prepared using the honeycomb molded body in which warpage occurs.

First, the drying jig according to the embodiments of the present invention will be described.

Here, the honeycomb molded body to be dried by the above-mentioned drying jig has a pillar-shaped configuration in which a large number of cells are longitudinally placed in parallel with one another with a cell wall therebetween and can be obtained by extrusion-molding a moist mixture formed by mixing and kneading inorganic powder and the like with a solvent.

The drying jig according to the embodiments of the present invention is a drying jig for drying the honeycomb molded body, and may be constituted by two or more separable jig members or may be constituted by one jig member which is openable and closable. In the present description, the drying jig constituted by two or more separable jig members is referred to as a separate type and the drying jig constituted by one openable and closable jig member is referred to as an open type. The drying jig according to the embodiments of the present invention having such a configuration is provided with a fixing member capable of preventing separation or opening between the jig members constituting the drying jig, and a piling member which enables the drying jig to be piled up in multi stage at the time of drying.

The drying jig is desirably a drying jig constituted by two separable jig members.

FIG. 1 is a perspective view schematically showing a mode in which two drying jigs according to the embodiments of the present invention are piled up, and description of the above-mentioned drying jig will be given with reference to FIG. 1.

One drying jig 10 is constituted by two jigs: an upper jig 11 which is made by bonding together the long sides of two narrow plate bodies such that an angle formed by the principal surface of each of the two plates is a right angle, and a lower jig 12 having a configuration similar to the upper jig 11. As shown in FIG. 1, a fixing member 13 is provided on the upper jig 11 to fix the upper jig 11 and the lower jig 12 after combining these two jigs. The fixing member may be provided on the upper jig or may be provided on the lower jig. The fixing member is preferably provided on the upper jig in consideration of the convenience of separating the two jig members.

This fixing member 13 is constituted by a fixing part 13a fixed to the plate body with screws, and a pressing part 13b rotatably attached to the fixing part 13a through a spring 13c. As shown in FIG. 1, a state of the fixing member 13 is divided into a fixed state in which the pressing part 13b presses down and fixes the lower jig 12, and a released state in which the pressing part 13b is inversely tilted toward almost the same direction as the fixing part 13a. In the fixing member 13, when the upper end of the pressing part 13b in a released state is moved a given distance outward (in a direction away from the fixing part 13a), the fixing member 13 is switched to a fixed state and presses the lower jig 12 surely to fasten it. On the other hand when the pressing part 13b in a fixed state is moved a given distance inward (in a direction approaching the fixing part 13a), the fixing member 13 is switched to a released state. A mechanism fastening the upper jig 11 and the lower jig 12 is not limited to a bias by a spring, and a hang up type hook and the like can also be employed.

As described above, the upper jig 11 and the lower jig 12 constituting the drying jig 10 are separable from each other in such a way that the upper jig 11 and the lower jig 12 can be independently handled. Even though the upper jig 11 and the lower jig 12 are separable, it becomes easier to surely fasten the upper jig and the lower jig to each other by the fixing member 13 provided on the upper jig 11 or the lower jig 12. The holding power of this fixing member 13 is, for example, a holding power of a level that can adequately hold down a pressure, which tends to be generated due to the possible warpage of a honeycomb molded body 1 produced in response to the progress of drying, applied to the drying jig with the upper jig 11 and the lower jig 12 fastened to each other.

When the upper jig 11 and the lower jig 12 are separable, it becomes easier to lift the upper jig 11 so that the upper jig and the lower jig are separated, for example, by clipping the upper sides of both pressing parts 13b with a hook or the like so as to tilt the upper sides of the pressing part 13b toward the fixing part 13a side to release the fixation of the lower jig 12 by the pressing part 13b in the fixing members 13 attached to symmetric positions of the two plate bodies constituting the upper jig 11.

In such a configuration, a procedure of making the drying jig 10 hold the honeycomb molded body 1 includes only placing the honeycomb molded body 1 on an opened lower jig 12 and adjusting the upper jig 11 again so that it is fixed to the lower jig 12; thus, it becomes easier for the honeycomb molded body 1 to be held by the drying jig 10 without going through a complex process. Therefore, handling of the honeycomb molded body is easy and it becomes easier to prevent the occurrence of break or the like. Further, it becomes easier to separate or fasten the upper jig and the lower jig from or to each other readily by the fixing member 13, and to attain good handling properties.

In addition, when the jig member constituting the drying jig can be separated into the upper jig and the lower jig, it becomes easier to use the other jig continuously even if one jig is damaged; thus, a separable drying jig is desirably used also in this point.

Further, when the upper jig 11 and the lower jig 12 are separable from each other, it becomes easier to automate a part of or all of a process for drying the honeycomb molded body with the drying jig according to the embodiments of the present invention readily.

Specifically, for example, it becomes easier to automate a part of or all of a process for drying the honeycomb molded body as described below in processes (1) to (3). (1) The honeycomb molded body 1 is placed on the lower jig 12 located at a specified position, the upper jig 11, suspended from a crane and the like having a clipping mechanism, is located above the lower jig 12, and the upper jig 11 and the lower jig 12 are fastened to each other by releasing the clipping mechanism. (2) Next, the honeycomb molded body is dried while conveying the drying jig 10 holding the honeycomb molded body 1 into a dryer with a belt conveyor and the like. (3) After drying, the fixing member is released by clipping both pressing parts again with the crane and the like having a clipping mechanism, and the dried honeycomb molded body is taken out from the lower jig 12 by lifting the upper jig.

In addition, when the upper side of the pressing part 13b is only hooked with a hook and the like of the clipping mechanism without tilting the pressing part 13b toward the fixing part 13a side with the clipping mechanism, it becomes easier to lift and move the drying jig while fastening the upper jig 11 and the lower jig 12 to each other.

Since this drying jig is thus provided with two separable jig members, it becomes easier to automate a part of or all of a process for drying the honeycomb molded body readily, and it becomes easier to promote a more efficient performance of the drying process and space saving effectively.

The drying jig can be suitably used even if it is a drying jig constituted by one jig member which is openable and closable.

The structure of the one jig member which is openable and closable is not particularly limited, and for example, the upper jig 11 and the lower jig 12 can form one jig member which is openable and closable by changing one of the fixing members 13, which are symmetrically provided at the same level when the upper jig 11 is overlaid on the lower jig 12 as shown in FIG. 1, to a hinge mechanism, and by fastening the upper jig 11 and the lower jig 12 to each other with this hinge mechanism. Further, the upper jig 11 and the lower jig 12 may form one jig member, which is openable and closable, by forming a groove, through which the upper jig 11 and the lower jig 12 can be fitted into each other, in a longitudinal direction at the contact portion (an end of a long side of the plate body) between the upper jig 11 and the lower jig 12, and by slidably fitting the upper jig 11 and the lower jig 12 into each other in a horizontal direction along the groove. The one jig member which is openable and closable is preferably constructed by fastening the upper jig and the lower jig mutually with a hinge mechanism. Moreover, the fixing member 13 is preferably provided on the upper jig 11 in consideration of the convenience of opening as with the drying jig provided with the two separable jig members.

Even when the drying jig is constituted by the one jig member which is openable and closable, it becomes easier to attain an effect similar to that in the case of constituting the drying jig of the two separable jig members.

Further, a material of the upper jig 11 and the lower jig 12 is not particularly limited, and specific examples thereof include epoxy resin, polycarbonate, polystyrene, polyethylene terephthalate, polyamideimide, polyphenylene sulfide and the like.

These materials tend not to cause deformation at the degreasing temperature, and are superior in durability.

Although not shown in the figure, the drying jig according to the embodiments of the present invention may be provided with an elastic member which is capable of absorbing a water content, which is interposed between the honeycomb molded body 1 and the upper jig 11 and/or the lower jig 12 upon holding of the honeycomb molded body 1 by the drying jig. With such an elastic member, vaporized water is absorbed by this elastic member and drying efficiency of the honeycomb molded body is improved. As the elastic member, a porous elastic member made of plastic or rubber is preferred, and an elastic member made of silicon sponge is more preferred.

Desirably, the piling member is provided on both the upper side and the lower side of the drying jig, and one piling member has a convex shape and another piling member has a concave shape which can be fitted in the convex shape.

A piling member 11a is provided on the upper jig 11 and a piling member 12a is provided on the lower jig 12. The piling member 12a provided on the lower side of the lower jig 12 also acts as a supporting member for placing the lower jig 12 stably on a floor, and a concave portion (refer to FIGS. 2A and 2B) is formed on the bottom side of the piling member 12a so that a piling member 11a of another drying jig 10 can be received. The piling member 11a is provided on the upper side of the upper jig 11 and has a slightly smaller size than that of the concave portion of the piling member 12a in such a way that it can be fitted in the concave portion of the piling member 12a provided on the lower side of the lower jig 12 as described above.

Figure 2A:
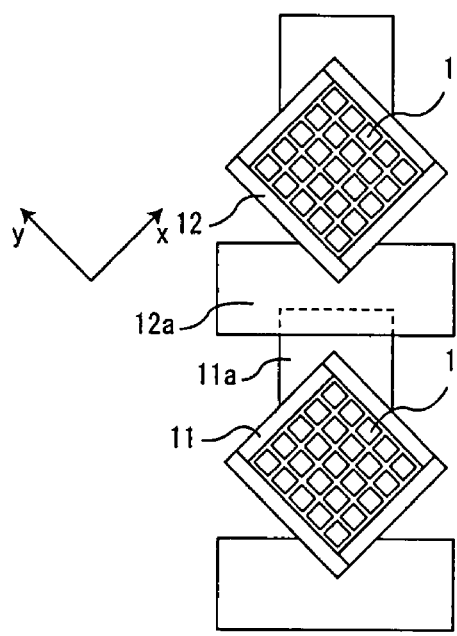
FIG. 2A is a front view schematically showing an example of fitting of one piling member in a drying jig according to the embodiments of the present invention to another piling member in another drying jig according to the embodiments of the present invention.
Figure 2B:
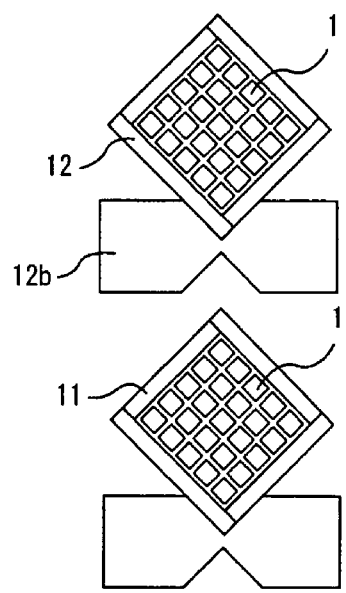
FIG. 2B is a front view schematically showing another example of fitting of one piling member in a drying jig according to the embodiments of the present invention to another piling member in another drying jig according to the embodiments of the present invention.
Figure 2C:
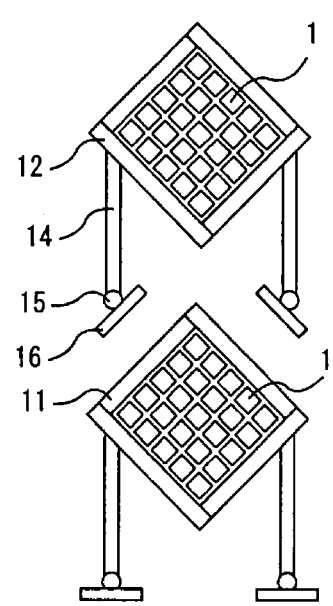
FIG. 2C is a front view schematically showing yet another example of fitting of one piling member in a drying jig according to the embodiments of the present invention to another piling member in another drying jig according to the embodiments of the present invention.

FIG. 2A is a front view schematically showing an example of fitting of one piling member in a drying jig according to the embodiments of the present invention to another piling member in another drying jig according to the embodiments of the present invention, FIG. 2B is a front view schematically showing another example of fitting of one piling member in a drying jig according to the embodiments of the present invention to another piling member in another drying jig according to the embodiments of the present invention, and FIG. 2C is a front view schematically showing yet another example of fitting of one piling member in a drying jig according to the embodiments of the present invention to another piling member in another drying jig according to the embodiments of the present invention.

In the drying jig shown in FIG. 2A, as described with reference to FIG. 1, the piling member 11a is formed on the upper jig 11 and the piling member 12a is formed on the lower jig 12, and both piling members are formed so as to be fit in each other.

However, a shape of a piling member formed in the drying jig according to the embodiments of the present invention is not limited to such a shape that the piling member 11a provided on the upper side of the drying jig is fitted in the concave portion of the piling member 12a provided on the lower side of another drying jig as shown in FIG. 1.

For example, as shown in FIG. 2B, another example of a structure of the piling member includes a structure in which a piling member 11a is not formed on the upper side of an upper jig 11 but only a piling member 12b is formed on the lower side of a lower jig 12 and a concave portion is formed on the lower side of the piling member 12b so that it can be fitted in a crest portion (a corner portion) formed by plate bodies bonded to each other in the upper jig 11.

By adopting this configuration, work of fitting one piling member in another piling member becomes very easy, and it becomes easier to prevent the damage to the piling member when forcedly fitting one piling member in another piling member. Further, this configuration eliminates the need for the piling member 11a and it becomes easier to realize further space saving of the drying line.

In addition to the above-mentioned configuration, the piling member may have a structure in which it has a supporting member provided in a vertically downward direction from the lower side face of the drying jig. That is, as shown in FIG. 2C, a supporting member 14 is attached to a side face of the lower jig in the vertically downward direction, and a flat plate 16 is coupled to an end of this supporting member through an approximately spherical joint member 15 which is rotatable at an arbitrary angle. When one drying jig to which the supporting rod 14 coupled to this flat plate 16 is attached is piled up on another drying jig, the drying jig can be piled up stably since the flat plate 16 abuts against a inclined side face of the upper jig of another drying jig without gap. In this case, it is desirable that in order to prevent the flat plate 16 from slipping down the inclined side face, a concave portion which is slightly larger than the flat plate is formed on the side face of the upper jig, against which the flat plate 16 abuts, so that it becomes easier for the flat plate 16 to fit into the upper jig, or a member for preventing slipping down of the flat plate, such as a friction plate, is formed on the surface of the flat plate. Incidentally, the flat plate 16 is not particularly limited and it may be rectangle-shaped or disc-shaped.

As for a position of the supporting member 14 to be attached and number of the supporting members 14, the supporting member 14 is preferably attached in the vertically downward direction to at least four locations in total in the vicinity of a corner portion on the side of a long side making contact with the upper jig in two plate bodies constituting the lower jig.

It is possible to place the drying jig stably on a floor also when this configuration is adopted.

With respect to the supporting member, examples thereof include a supporting rod, a supporting plate and the like; and the supporting plate may have pores formed therein or may have a meshed pattern.

By thus placing the honeycomb molded body on the lower jig 12, piling up the upper jig 11 thereon and fixing the upper jig 11 with a fixing member 13, the honeycomb molded body is fixed in a state of surrounding nearly the whole surface of a side face parallel to the longitudinal direction, with a drying jig. Therefore, it becomes possible to dry the honeycomb molded body uniformly, and further it becomes difficult for the warpage and the like of the honeycomb molded body after drying to occur.

In addition, if piling members 11a, 12a, 12b constructed as described above are used, it becomes easier to dry the honeycomb molded body efficiently using a dryer spatially and in addition to achieve space saving of a drying line and an improvement in drying efficiency, by vertically piling up a drying jig 10 constituted by the upper jig 11 and the lower jig 12 after combining the upper jig 11 and the lower jig 12.

The drying jig according to the embodiments of the present invention desirably has such a configuration that the honeycomb molded body having a shape of a square pillar can be held so that the longitudinal direction of the honeycomb molded body is held in the horizontal direction while the opposite angles of the square shape in the cross-section perpendicular to the longitudinal direction of the honeycomb molded body are almost located on the same vertical line.

In the present description, the term "the opposite angles of the square shape, in the cross-section perpendicular to the longitudinal direction of the honeycomb molded body are located on the same vertical line" refers to a state in which the longitudinal direction of the honeycomb molded body is level and the honeycomb molded body is inclined so that the angle which a longitudinal side face of the honeycomb molded body forms with a horizontal plane is about 45°.

The reason for this will be described with reference to FIG. 2A assuming that in an approximate "L" configuration formed in the cross-section perpendicular to the longitudinal direction of the lower jig 12, an inflected point of the approximate "L" configuration is an origin point and respective sides of the approximate "L" configuration are the x-axis and the y-axis.

More specifically, when the lower jig 12 is inclined so that the opposite angles of the square shape in the cross-section perpendicular to the longitudinal direction of the honeycomb molded body are almost located on the same vertical line, in other words, when the lower jig is inclined so that smaller one of the angles which the x-axis and the y-axis form with a horizontal direction is about 45°, even if the honeycomb molded body is placed at a position (a position to which the square shape in the cross-section perpendicular to the longitudinal direction of the honeycomb molded body is deviated in the direction of the x-axis or the y-axis from an origin point) other than a specified position in placing it on the lower jig, the placed honeycomb molded body moves by virtue of a slope of the x-axis or y-axis so that a corner of the square shape reaches the origin point to revise the placed position to the specified position. That is, the honeycomb molded body moves to the lowest position on the lower jig 12 by virtue of gravity. Thus, when the upper jig 11 is further piled up, it becomes easier to prevent the occurrence of the damage and the like of a honeycomb molded body.

On the other hand, for example, when the x-axis or the y-axis is in the horizontal direction, in other words, when a side face of the lower jig is in the horizontal direction, the opposite angles of the square shape in the cross-section perpendicular to the longitudinal direction of the honeycomb molded body are not located on the same vertical line.

In a case where the honeycomb molded body is placed on such a lower jig, and the honeycomb molded body is placed at a position other than a specified position, the honeycomb molded body does not move to the specified position by itself since one side face of the lower jig is held in the horizontal direction and another side face is vertical, and therefore the work of correcting the deviated position is required after placing. In the case of leaving the honeycomb molded body without correcting the deviated position, the damage of the honeycomb molded body may occur when the upper jig is overlaid on the honeycomb molded body.

When the x-axis and the y-axis are inclined at an angle other than about 45° with respect to the horizontal direction (specifically, for example when the x-axis is inclined at about 60° with respect to the horizontal direction and the y-axis is inclined at about 30° with respect to the horizontal direction), even if the honeycomb molded body is placed at a position deviated from a specified position in placing it on the lower jig, the deviated position will be resolved by itself since the side face of the lower jig is inclined.

However, in such a case, when the cross-section perpendicular to the longitudinal direction is divided into two parts by a vertical line, shapes of two parts are not symmetric in both the lower jig and the upper jig. Accordingly, the work of checking the orientation of the drying jig one by one is required in piling up the drying jig, and therefore this case is disadvantageous from the viewpoint of improving work efficiency.

Therefore, the drying jig of the present invention desirably has the above-mentioned construction.

Further, when the honeycomb molded body is held with the drying jig so that the opposite angles of the square shape in the cross-section perpendicular to the longitudinal direction of the honeycomb molded body are almost located on the same vertical line, the upper jig will be positioned just at the upper half of the drying jig.

Therefore, this construction is suitable for, for example, placing the honeycomb molded body, the upper jig and the like on the lower jig or inversely lifting them from the lower jig using a crane, movable head and the like having a clipping mechanism and this construction is effective for improvement in work efficiency and the promotion of automation of a process.

Next, a drying method of a honeycomb molded body according to the embodiments of the present invention will be described.

A drying method of a honeycomb molded body according to the embodiments of the present invention is a drying method of a honeycomb molded body comprising drying the honeycomb molded body after surrounding, in an adhered state with a drying jig, nearly the whole surface of a side face parallel to the longitudinal direction of a pillar-shaped honeycomb molded body having a large number of cells longitudinally placed in parallel with one another with a cell wall therebetween, wherein the drying jig comprises a fixing member for preventing separation or opening of the drying jig, and a piling member which enables the drying jig to be piled up in multi stage at the time of drying, preventing separation or opening of the drying jig by adjusting the fixing member after surrounding the honeycomb molded body with the drying jig, and thereafter piling up in multi stage through the piling member, the honeycomb molded body under a surrounded state by the drying jig, passing the honeycomb molded body inside a dryer for a predetermined period of time, so that the honeycomb molded body is dried.

In the drying method of a honeycomb molded body according to the embodiments of the present invention, the drying jig is not particularly limited but a drying jig provided with two separate jigs or one jig member which is openable and closable is desirably used. It is desirable that the piling member is provided on both the upper side and the lower side of the drying jig, and one piling member has a convex shape, and another piling member has a concave shape which can be fitted in the convex shape. Further, the drying jig is desirably constructed in such a way that the honeycomb molded body having a shape of a square pillar can be held so that the longitudinal direction of the honeycomb molded body is held in the horizontal direction while the opposite angles of the square shape in the cross-section perpendicular to the longitudinal direction of the honeycomb molded body are almost located on the same vertical line.

As such a drying jig which can be used in the drying method of a honeycomb molded body according to the embodiments of the present invention, the drying jig according to the embodiments of the present invention can be suitably used. Since the details thereof have been described in the description of the drying jig according to the embodiments of the present invention, only a brief description thereof will be given hereinafter.

When the drying jig is provided with one jig member which is openable and closable, the honeycomb molded body is placed and held in a drying jig in an open state and then the drying jig is closed by a fixing member, and thereby nearly the whole surface of a side face parallel to the longitudinal direction of a honeycomb molded body is surrounded with a drying jig. The drying jig is piled up in multi stage through the piling member thereafter, and the honeycomb molded body is dried while passing the honeycomb molded body inside a dryer for a predetermined period of time.

When the drying jig is provided with two separate jigs, first, the honeycomb molded body is placed and held in the lower jig. Next, the upper jig is overlaid on the placed honeycomb molded body so as to surround the honeycomb molded body in an adhered state, and the upper jig and the lower jig are fastened with a fixing member. Then, in a similar way as described above, the drying jig is piled up in multi stage through the piling member, and the honeycomb molded body is sent into a dryer to be dried.

Examples of a drying method of a honeycomb molded body in a dryer are not particularly limited and include, for example, hot-air drying, infrared drying, microwave drying, humidity drying, electric drying or combinations thereof. Examples of a combination of drying methods include, for example, a combination of the hot-air drying and the microwave drying, a combination of the hot-air drying and the infrared drying and the like, and among them, the combination of the hot-air drying and the microwave drying is preferred.

In the drying method of a honeycomb molded body according to the embodiments of the present invention, when the hot-air drying and the microwave drying are used in combination, both drying methods may be simultaneously or alternately applied to the honeycomb molded body in one process. Further, when the hot-air drying and the microwave drying are performed in separate processes, the honeycomb molded body may be subjected to a hot-air drying process and then transferred to a microwave drying process, or it may be subjected to a microwave drying process and then transferred to a hot-air drying process. As an order in which the hot air drying and the microwave drying are performed in the combined use of the hot air drying and the microwave drying, an order in which the microwave drying is carried out and then the hot air drying is performed is desirable. By performing the combination of the hot-air drying and the microwave drying in separate processes and performing the hot-air drying after subjecting the honeycomb molded body to the microwave drying process as described above, it becomes easier to achieve an efficient drying process without causing damage and the like to the honeycomb molded body.

However, when the drying jig of the present invention is used also in a microwave drying process, it is necessary that materials of the upper jig 11 and the lower jig 12 constituting the drying jig are a heat resistant microwave-permeable material such as the above-mentioned epoxy resin and the like. The reason for this is that if a drying jig made of a microwave-nonpermeable material is used, it becomes difficult to dry the honeycomb molded body.

When a drying jig made of a heat resistant microwave-permeable material is used, it become easier to carry out both of the microwave drying process and the hot-air drying process while keeping the honeycomb molded body held by the same drying jig and the drying jig does not need to be changed in the overall drying process; thus, it becomes easier to improve work efficiency of the overall drying process.

Figure 3:
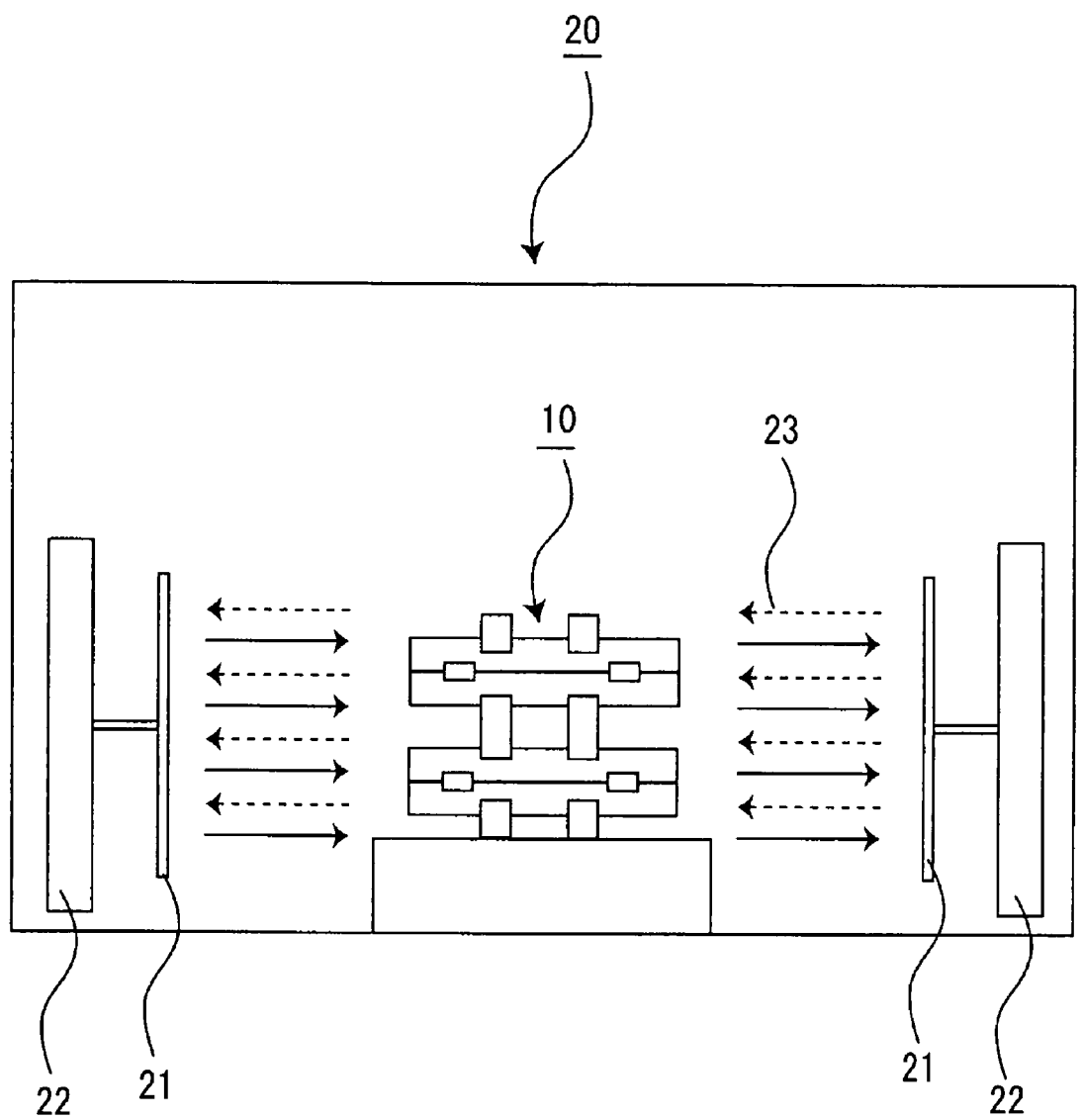
FIG. 3 is a cross sectional view schematically, showing an example of a dryer used in a drying method of a honeycomb molded body according to the embodiments of the present invention.

FIG. 3 is a cross sectional view schematically showing an example of a dryer used in a drying method of a honeycomb molded body according to the embodiments of the present invention. The dryer shown in FIG. 3 is a hot-air dryer, and a honeycomb molded body surrounded by a drying jig 10 is carried in a dryer 20 provided with a hot-air generating device 22 and a fan 21 and dried with hot-air 23. If the dryer shown in FIG. 3 is assumed to be a microwave dryer, the hot-air generating device 22 corresponds to a microwave generating device, the fan 21 to a microwave impeller and the hot-air 23 to a microwave.

As a matter of course, a configuration of a dryer can be appropriately changed in design in accordance with a drying method to be adopted. For example, as the configuration of a dryer, there may be employed a configuration in which hot-air is blown from the right and left sides of the drying jig and a microwave is irradiated from the above and below sides of the drying jig so that both the microwave drying and the hot-air drying can be simultaneously carried out.

Number of stages in which the drying jig is piled up is not particularly limited and any stages such as two, three or four stages may be used; however, about two or three stages is preferred in consideration of an amount of water produced at the time of drying and number of stages in which the drying jig is piled up stably.

A dryer used in the drying method of the honeycomb molded body according to the embodiments of the present invention is provided with a transporting means such as a belt conveyer and the like. A drying jig 10 in which the honeycomb molded body is housed is generally piled up in two or three stages, and then the piled up drying jigs 10 are placed on the transporting means in a direction orthogonal to the machine direction of the transporting means. Then, after the drying jigs 10 placed on the transporting means are sent in the dryer 20 (for example, a hot-air dryer), the hot-air 23 is flown from both sides of the transporting means so as to blow into a cell in the honeycomb molded body. Blowing of the hot-air 23 may be performed simultaneously from both sides or alternately from the right side and the left side. Thus, it becomes easier to dry the honeycomb molded body with efficiency in a short time in the drying method of a honeycomb molded body according to the embodiments of the present invention.

Further, when the drying jig surrounding the honeycomb molded body is transported by a transporting means such as a belt conveyer and the like, its transportation may be continuous or intermittent.

In the drying by a dryer, since the honeycomb molded body is dried using a drying jig 10, the work of surrounding the honeycomb molded body 1 with a drying jig 10 (the work of placing the honeycomb molded body 1 on the lower jig 12, piling up the upper jig 11 thereon and fixing the upper jig 11 with a fixing member 13), the work of disassembling the drying jig 10 after the completion of a drying process, and the work of taking the honeycomb molded body 1 out of the drying jig are required.

A drying condition cannot be specified indiscriminately since they vary with specific situations such as a size or a configuration of an honeycomb molded body to be dried, but it is generally preferred that a dryer internal temperature is at least about 80° C. and at most about 150° C.

When the dryer internal temperature falls within the above-mentioned range, it becomes easier to dry the honeycomb molded body adequately and to prevent dissipation of a binder and the like due to excessive heat.

A velocity of a hot air during hot air drying is preferably at least about 5.0 m/sec and at most about 50.0 m/sec.

When the velocity of a hot air falls within the above-mentioned range, the honeycomb molded body can be dried in a short time and the displacement of the drying jig due to a hot air does not occur.

A residence time of the honeycomb molded body in a dryer is preferably at least about 10 minutes and at most about 20 minutes, and in this time range it becomes easier to dry the honeycomb molded body to a desired dried state.

In the drying method of a honeycomb molded body according to the embodiments of the present invention, it is desirable that the honeycomb molded body is dried in advance with a microwave prior to holding the honeycomb molded body with a drying jig to dry it.

Since the honeycomb molded body thus dried in advance with a microwave has higher strength than an undried honeycomb molded body, its handling, for example, in placing the honeycomb molded body on the lower jig 12 becomes better. In addition, failure, such as break, of the honeycomb molded body may not occur in correcting a position of the honeycomb molded body in the case where the honeycomb molded body is placed at a position other than a specified position on the lower jig.

When the honeycomb molded body is dried with a microwave prior to holding the honeycomb molded body with a drying jig as described above, a honeycomb molded body prepared by extrusion molding or the like is carried in a passage for a molded body in a microwave drying apparatus provided with a microwave generating device and a microwave impeller.

In this microwave drying apparatus, by stirring a microwave to be irradiated with a microwave impeller, the microwave is irradiated to the honeycomb molded body uniformly to heat a dispersion medium solution and the like, so that the honeycomb molded body is dried.

The conditions, such as a power of a microwave, in carrying out such drying treatment by a microwave cannot be specified indiscriminately since they are dependent on a configuration or a cell size of an objective honeycomb molded body, but in the case, for example, where a honeycomb molded body has a size of about 33 mm×about 33 mm×about 300 mm, number of cells of about 31 pcs/cm$^2$ and a thickness of a cell wall of about 0.35 mm, a power of a microwave is preferably of the order of at least about 0.5 kW and at most about 4 kW. Further, even if a shape and cell size of the honeycomb molded body differ, drying conditions presumably do not deviate far from the above-mentioned conditions.

In the drying method of a honeycomb molded body according to the embodiments of the present invention, since by use of the drying jig, the honeycomb molded body is mechanically pressed from the surroundings and is fixed in an adhered state so as not to change in its shape, it becomes easier to bring the honeycomb molded body to a state of containing little water content without causing the honeycomb molded body to warpage. In the drying method of a honeycomb molded body according to the embodiments of the present invention, since the drying jig is provided with a piling member, it becomes easier to dry the honeycomb molded body in a state in which the drying jig under a state of surrounding the honeycomb molded body is piled up in multi stage and thus it becomes easier to carry out efficient drying on the honeycomb molded body.

Since a drying jig used in the drying method of a honeycomb molded body according to the embodiments of the present invention is provided with a fixing member for preventing separation or opening of the drying jig, together with a piling member which enables the drying jig to be piled up in multi stage at the time of drying, the work of surrounding the honeycomb molded body with a drying jig 10, the work of disassembling the drying jig 10 after the completion of a drying process and further it becomes easier to carry out the work of taking the honeycomb molded body out of the drying jig readily.

Next, a manufacturing method of a honeycomb structured body according to the embodiments of the present invention will be described.

The manufacturing method of a honeycomb structured body according to the embodiments of the present invention is a manufacturing method of a honeycomb structured body comprising manufacturing a pillar-shaped honeycomb molded body having a large number of cells longitudinally placed in parallel with one another with a cell wall therebetween, by molding a ceramic material; drying the honeycomb molded body after surrounding, in an adhered state with a drying jig, nearly the whole surface of a side face parallel to the longitudinal direction of the honeycomb molded body; and firing the honeycomb structured body, to manufacture a honeycomb structured body comprising a honeycomb fired body.

Herein, the drying jig comprises a fixing member for preventing separation or opening of the drying jig, and a piling member which enables the drying jig to be piled up in multi stage at the time of drying.

In the drying of the honeycomb molded body, after surrounding the honeycomb molded body with the drying jig, separation or opening of the drying jig is prevented by adjusting the fixing member, and the honeycomb molded body under a surrounded state by the drying jig is piled up in multi stage through the piling member thereafter, and the honeycomb molded body is dried by passing the honeycomb molded body inside a dryer for a predetermined period of time.

A honeycomb structured body obtained by the manufacturing method according to the embodiments of the present invention may comprise a honeycomb fired body obtained by sintering a honeycomb molded body having a large number of cells longitudinally placed in parallel with one another with a cell wall therebetween. Accordingly, the honeycomb structured body may be formed by firing a pillar-shaped honeycomb molded body having a large number of cells longitudinally placed in parallel with one another with a cell wall therebetween and binding a plurality of obtained honeycomb fired bodies by interposing a sealing material layer (an adhesive layer), or may be a pillar-shaped honeycomb structured body comprising one honeycomb fired body obtained by firing a honeycomb molded body having a large number of cells longitudinally placed in parallel with one another with a cell wall therebetween. Further, in the present specification, a former honeycomb structured body obtained by binding a plurality of honeycomb fired bodies by interposing a sealing material layer (an adhesive layer) is referred to as an aggregated honeycomb structured body, and a latter pillar-shaped honeycomb structured body comprising one honeycomb fired body is referred to as a integral honeycomb structured body.

Hereinafter, the manufacturing method of a honeycomb structured body according to the embodiments of the present invention will be described with reference to FIGS. 4 to 6 for the case of the aggregated honeycomb structured body, and then description will be given of the manufacturing method of the integral honeycomb structured body.

Figure 4:
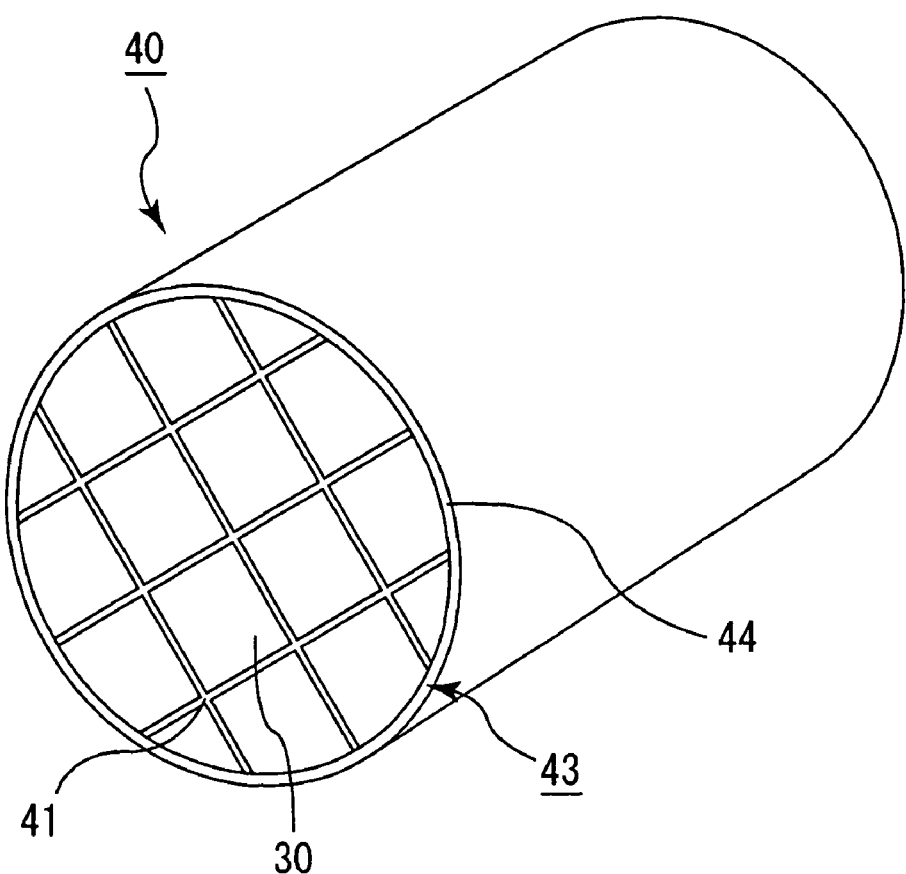
FIG. 4 is a perspective view schematically showing an example of an aggregated honeycomb structured body manufactured in the manufacturing method of a honeycomb structured body according to the embodiments of the present invention.
Figure 5A:
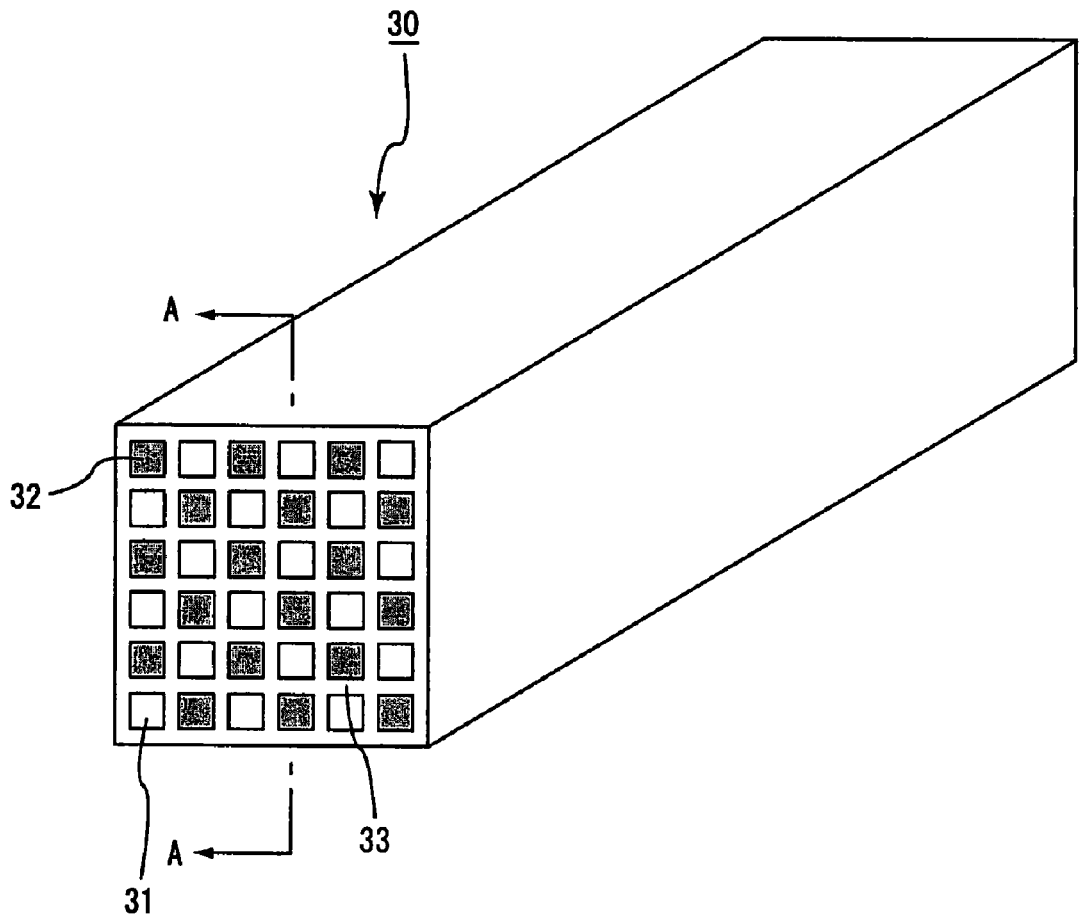
FIG. 5A is a perspective view schematically showing a honeycomb fired body constituting a honeycomb structured body manufactured in the manufacturing method of a honeycomb structured body according to the embodiments of the present invention.
Figure 5B:
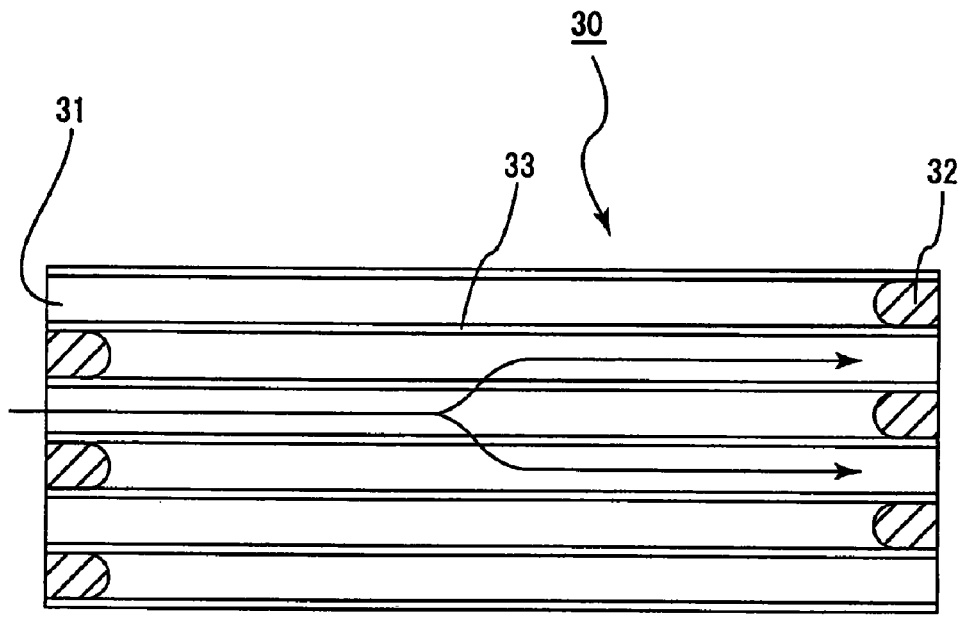
FIG. 5B is a cross sectional view taken along line A-A of FIG. 5A.

FIG. 4 is a perspective view schematically showing an example of an aggregated honeycomb structured body manufactured in the manufacturing method of a honeycomb structured body according to the embodiments of the present invention. FIG. 5A is a perspective view schematically showing a honeycomb fired body constituting the above-mentioned honeycomb structured body manufactured in the manufacturing method of a honeycomb structured body according to the embodiments of the present invention. FIG. 5B is a sectional view taken along line A-A of FIG. 5A.

In such a honeycomb structured body 40, a plurality of honeycomb fired bodies 30 shown in FIGS. 5A and 5B are generally bound to one another by interposing a sealing material layer (adhesive layer) 41 to form a honeycomb block 43. Further, a sealing material layer (coat layer) 44 is formed on the periphery of the honeycomb block 43. The honeycomb fired body 30 has a large number of cells 31 longitudinally placed in parallel with one another as shown in FIG. 5A, and a cell wall 33 separating the cells 31 from one another functions as a filter.

That is, in the cell 31 formed in the honeycomb fired body 30, as shown in FIG. 5B, either of ends on an inlet side or an outlet side of exhaust gas is sealed with a plug material layer 32, exhaust gas flown into one cell 31 always passes through a cell wall 33 separating cells 31 and then flown out of another cell 31, and particulates are captured at a portion of the cell wall 33 at the time when the exhaust gas passes through this cell wall 33, and the exhaust gas is purified.

Examples of a principal component of a material of a honeycomb structured body manufactured by the manufacturing method according to the embodiments of the present invention include, for example, nitride ceramics such as aluminum nitride, silicon nitride, boron nitride, and titanium nitride, carbide ceramics such as silicon carbide, zirconium carbide, titanium carbide, tantalum carbide, and tungsten carbide, oxide ceramics such as alumina, zirconium, cordierite, mullite, and aluminum titanate, and the like. Among these compounds, powder of silicon carbide having high heat resistance, excellent mechanical properties and high thermal conductivity is desirable. Further, the principal component may be silicon-containing ceramic prepared by blending the above-mentioned ceramics with metal silicon, or ceramic bound with silicon or a silicate compound may be used, and for example, ceramic prepared by blending silicon carbide with metal silicon is suitably used.

Here, a manufacturing method of a honeycomb structured body according to the embodiments of the present invention will be described taking as an example a manufacturing method of a honeycomb structured body containing silicon carbide as a principal component of a material.

First, a mixed powder is prepared by dry mixing an inorganic powder such as silicon carbide powders having different average particle diameters and an organic binder, and mixed liquid is prepared by mixing a liquid plasticizer, lubricant and water. Subsequently, the mixed powder and the mixed liquid are mixed with a wet mixer to prepare a wet mixture for molding.

A particle diameter of the silicon carbide powder is not particularly limited but since a silicon carbide powder which has less shrinkage in a subsequent firing process is preferred, for example, a powder prepared by combining 100 parts by weight of powder having an average particle diameter of the order of at least about 0.3 µm and at most about 50 µm and at least about 5 parts by weight and at most about 65 parts by weight of powder having an average particle diameter of the order of at least about 0.1 µm and at most about 1.0 µm is preferred.

In order to adjust the pore diameter and the like of the honeycomb fired body, it is necessary to adjust the firing temperature. The pore diameter can also be adjusted by adjusting the particle diameter of the inorganic powder.

Examples of the organic binder are not particularly limited and include, for example, methyl cellulose, carboxymethyl cellulose, hydroxyethyl cellulose, polyethylene glycol, phenol resin, epoxy resin and the like. Among them, methyl cellulose is desirable.

Desirably, an amount of the organic binder to be mixed is generally of the order of at least about 1 part by weight and at most about 10 parts by weight with respect to 100 parts by weight of the inorganic powder.

Examples of the plasticizer are not particularly limited and include, for example, glycerol and the like.

Examples of the lubricant are not particularly limited and include, for example, polyoxyalkylene compounds such as polyoxyethylene alkyl ether, polyoxypropylene alkyl ether and the like.

Specific examples of the lubricant include, for example, polyoxyethylene monobutyl ether, polyoxypropylene monobutyl ether and the like.

In addition, there is no necessity that the plasticizer and the lubricant are contained in the mixed liquid in some cases.

On the occasion of preparing the wet mixture, a dispersion medium solution may be used, and examples of the dispersion medium solution include, for example, water, organic solvents such as benzene and the like, and alcohols such as methanol and the like.

Further, a molding assistant may be added to the wet mixture.

Examples of the molding assistant are not particularly limited and include, for example, ethyleneglycol, dextrin, fatty acid, fatty acid soap, polyalcohol and the like.

Moreover, a pore-forming agent, such as balloons that are fine hollow spheres composed of oxide-based ceramics, spherical acrylic particles or graphite, and the like may be added to the moist mixture, if necessary.

The above-mentioned balloons are not particularly limited and, for example, alumina balloons, glass micro-balloons, shirasu balloons, fly ash balloons (FA balloons), mullite balloons and the like may be used. Among these, alumina balloons are more desirably used.

A wet mixture prepared here, in which silicon carbide powder is used, is desirably at a temperature of about 28° C. or less. The reason for this is that when the temperature is about 28° C. or less, it becomes difficult for the organic binder to gelate.

A proportion of organic matter in the wet mixture is desirably about 10% by weight or less, and a content of water in the wet mixture is desirably at least about 8% by weight and at most about 20% by weight.

Next, this wet mixture is extrusion-molded by an extrusion-molding process and the like. By cutting a molded body obtained by extrusion-molding with a cutter, a honeycomb molded body having the same configuration as that of a pillar-shaped honeycomb fired body 30 shown in FIG. 5A, but without the end being plugged, is prepared.

Next, the honeycomb molded body is dried using a microwave dryer and the like, and then drying the honeycomb molded body is carried out.

Here, in the manufacturing method of a honeycomb structured body according to the embodiments of the present invention, there is carried out drying on the honeycomb molded body after surrounding, in an adhered state with a drying jig, nearly the whole surface of a side face parallel to the longitudinal direction of a pillar-shaped honeycomb molded body having a large number of cells longitudinally placed in parallel with one another with a cell wall therebetween.

In the drying, since the honeycomb molded body is surrounded, in an adhered state with a drying jig, and dried, it becomes easier to prevent the occurrence of warpage or the like of a honeycomb molded body associated with the progress of drying.

More specifically, the drying jig used in the drying process is provided with a fixing member for preventing separation or opening of the drying jig together with a piling member which enables the drying jig to be piled up in multi stage at the time of drying.

In the manufacturing method of a honeycomb structured body according to the embodiments of the present invention, the drying jig is not particularly limited but a drying jig provided with two separate jigs or one jig member which is openable and closable is desirable. In addition, it is desirable that the piling member is provided on both the upper side and the lower side of the drying jig, and one piling member has a convex shape and another piling member has a concave shape which can be fitted in the convex shape. Further, the drying jig desirably has such a configuration that it is easier for the drying jig to hold the honeycomb molded body having a shape of a square pillar so that the longitudinal direction of the honeycomb molded body is held in the horizontal direction while the opposite angles of the square shape in the cross-section perpendicular to the longitudinal direction of the honeycomb molded body are almost located on the same vertical line.

As the drying jig, the drying jig according to the embodiments of the present invention can be suitably used. Since the fixing member and piling member have been described in detail in the description of the drying jig according to the embodiments of the present invention, description thereof is omitted here.

In the drying of the honeycomb molded body, as with the drying method of the honeycomb molded body according to the embodiments of the present invention, after surrounding the honeycomb molded body with the drying jig, separation or opening of the drying jig is prevented by adjusting the fixing member, and the honeycomb molded body under a surrounded state by the drying jig is piled up in multi stage through the piling member thereafter, and the honeycomb molded body is dried by passing the honeycomb molded body inside a dryer for a predetermined period of time.

As the details of procedures of each process, there can be suitably used the procedures described in the description of the drying method of the honeycomb molded body according to the embodiments of the present invention.

By carrying out such drying, it becomes easier to prevent the occurrence of warpage or the like of a honeycomb molded body and since the drying jig is piled up spatially to dry the honeycomb molded body, it becomes easier to achieve a uniform and efficient drying condition. Further, it becomes easier to realize space saving and more efficient performance of the drying.

Next, if necessary, opening-sealing treatment in which a plug material paste is filled into a specified cell of the dried honeycomb molded body to form a plug material layer, is applied to the honeycomb molded body. Examples of the plug material paste are not particularly limited and include, for example, materials similar to the above-mentioned raw material paste. When the opening-sealing treatment is carried out in this process, a honeycomb structured body acting as a honeycomb filter for purifying exhaust gas can be manufactured through the succeeding process.

When the honeycomb molded body is thus subjected to opening-sealing treatment, drying of the plug material layer is carried out. A drying method of this drying is not particularly limited and the plug material layer may be dried by hot air drying or by applying a hot plate to the surface subjected to the opening-sealing treatment.

Next, the dried honeycomb molded body (its end may be sealed) is degreased to volatilize and decompose/dissipate a binder and the like by being heated to at least about 400° C. and at most about 650° C. in an oxygen-containing atmosphere, to make only an almost inorganic powder remain.

Then, after carrying out the degreasing treatment, the honeycomb molded body is heated to a temperature of at least about 1400° C. and at most about 2200° C. in an atmosphere of inert gas of nitrogen, argon or the like so that it is fired and inorganic powder is sintered, to manufacture a honeycomb fired body 30.

Next, an aggregated body of a honeycomb fired body to become a honeycomb block 43 is prepared.

The aggregated body of a honeycomb fired body has a pillar structure in which a plurality of square pillar-shaped honeycomb fired bodies 30 having a large number of cells 31 longitudinally placed in parallel with one another with a cell wall 33 therebetween are bound to one another through a sealing material layer (adhesive layer) 41.

Figure 6:
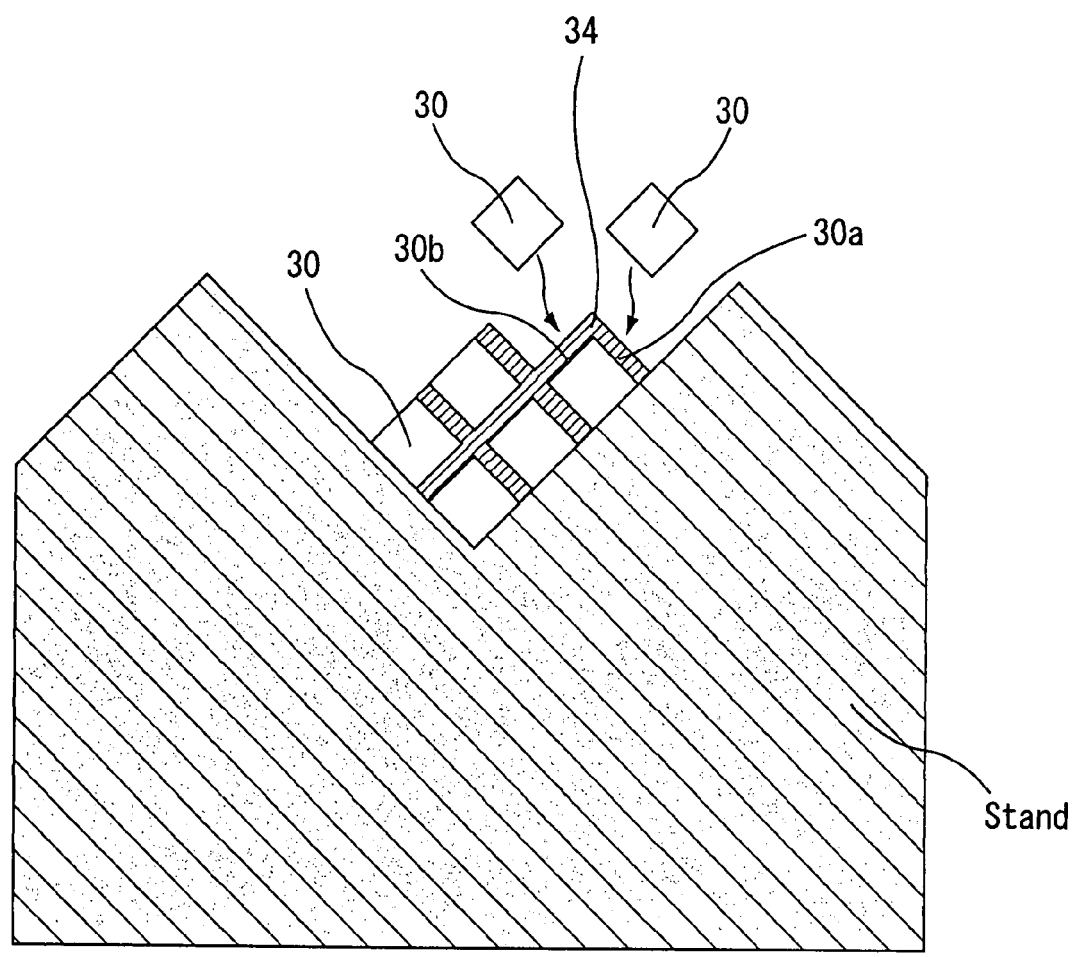
FIG. 6 is a side view schematically showing a manner in which the honeycomb fired body is piled up to manufacture an aggregated body of a honeycomb fired body in a manufacturing method of a honeycomb structured body according to the embodiments of the present invention.

In order to prepare the aggregated body of a honeycomb fired body, referring to FIG. 6, first, the honeycomb fired body 30 is placed in an inclined state on a stand constructed so as to have a V-shaped cross-section in such a way that the honeycomb fired body 30 can be piled up in an inclined state, and then a sealing material paste to become a sealing material layer (adhesive layer) 41 is applied in uniform thickness to two upward-facing side faces 30a, 30b to form a sealing material paste layer 34 and another honeycomb fired body 30 is piled on this sealing material paste layer 34, and such process is repeated to prepare an aggregated body of a pillar-shaped honeycomb fired body having a specified size.

Examples of a material constituting the sealing material paste to become a sealing material layer (adhesive layer) 41 are not particularly limited and include, for example, a material including inorganic fiber and/or an inorganic particle in addition to an inorganic binder and an organic binder.

Examples of the inorganic binder include, for example, silica sol, alumina sol and the like. Each of these may be used alone or two or more kinds of these may be used in combination. Among the inorganic binder, silica sol is desirable.

A content of the inorganic binder is desirably at least about 1% by weight and at most about 30% by weight in terms of solid matter content. When the content of the inorganic binder is about 1% by weight or more, it becomes possible to prevent a reduction in adhesive strength. On the other hand, when the content thereof is about 30% by weight or less, it becomes possible to prevent a reduction in a thermal conductivity.

Examples of the organic binder include, for example, polyvinyl alcohol, methyl cellulose, ethyl cellulose, carboxymethyl cellulose and the like. Each of these may be used alone or two or more kinds of these may be used in combination. Among the organic binders, carboxymethyl cellulose is desirable.

A content of the organic binder is desirably at least about 0.1% by weight and at most about 5.0% by weight in terms of solid matter content. When the content of the organic binder is about 0.1% by weight or more, it may become easier to inhibit the migration of a sealing material layer. On the other hand, when the content thereof is about 5.0% by weight or less, it becomes possible to prevent the proportion of the organic component from becoming too high with respect to the manufactured honeycomb structured body; thus it becomes hardly necessary to carry out heat treatment in the following process, regardless of a thickness of the sealing material layer.

With respect to the inorganic fibers, examples thereof may include ceramic fibers such as silica-alumina, mullite, alumina, silica and the like. Each of these may be used alone or two or more kinds of these may be used in combination. Among the inorganic fibers, silica-alumina fiber is desirably used.

A content of the inorganic fiber is desirably at least about 10% by weight and at most about 70% by weight in terms of solid matter content. When the content of the inorganic fiber is about 10% by weight or more, the elasticity hardly is deteriorated. On the other hand, when the content thereof is about 70% by weight or less, it becomes possible to prevent a reduction in thermal conductivity, together with a reduction in an effect as an elastic body.

With respect to the inorganic particles, examples thereof may include carbides, nitrides and the like, and specific examples may include inorganic powder or whisker and the like made from silicon carbide, silicon nitride, boron nitride and the like. Each of these may be used alone, or two or more kinds of these may be used in combination. Among the inorganic particles, silicon carbide having an excellent thermal conductivity is desirably used.

A content of the inorganic particle is desirably at least about 3% by weight and at most about 80% by weight in terms of solid matter content. When the content of the inorganic particle is about 3% by weight or more, it becomes possible to prevent a reduction in a thermal conductivity. On the other hand, when the content of inorganic particle is about 80% by weight or less, it becomes possible to prevent a reduction in adhesive strength when the sealing material layer is exposed to an elevated temperature.

A shot content of the inorganic fiber is desirably at least about 1% by weight and at most about 10% by weight. In addition, its fiber length is desirably at least about 5 μm and at most about 100 μm.

When the shot content is about 1% by weight or more, it is easy to manufacture the aggregated body of a honeycomb fired body and when the shot content is about 10% by weight or less, it becomes possible to prevent the periphery of the pillar-shaped body from being damaged. When the fiber length is about 5 μm or more, it becomes easier to construct a honeycomb structured body having elasticity. When the fiber length is about 100 μm or less, it becomes difficult for the fiber shot to take the tag-like form, and thus dispersion of an inorganic particle is prevented from becoming poor to make it easier to reduce a thickness of the sealing material layer.

A particle diameter of the inorganic particle is desirably at least about 0.01 μm and at most about 100 μm. When the particle diameter of the inorganic particle is about 0.01 μm or more, it becomes possible to prevent the manufacturing cost from becoming high. On the other hand, when the particle diameter is about 100 μm or less, it becomes possible to prevent a reduction in adhesive strength and a reduction in a thermal conductivity.

Next, this aggregated body of the honeycomb fired body is heated at a temperature of at least about 50° C. and at most about 100° C. for about 1 hour to dry and solidify the sealing material paste layer 34 to form a sealing material layer 41. Then, a honeycomb block 43 is prepared by cutting the peripheral portion of the aggregated body into such a shape as shown in FIG. 4 with, for example, a diamond cutter or the like.

In the cutting process, the honeycomb block 43 may be cut so as to have shapes such as a cylindroid and the like without limiting its shape to a cylindrical pillar.

Also, if necessary, the dried aggregated body of the honeycomb fired body may be cut in a direction perpendicular to its longitudinal direction prior to cutting its peripheral portion.

Examples of the method of cutting the aggregated body of the honeycomb fired body in a direction perpendicular to its longitudinal direction are not particularly limited and include, for example, a method of cutting a portion close to an end face of the aggregated body of the honeycomb fired body, in which all of the honeycomb fired body are bound, in a direction perpendicular to the longitudinal direction of the aggregated body of the honeycomb fired body with a diamond cutter and the like.

Further, the longitudinal direction of the aggregated body of the honeycomb fired body or the honeycomb structured body refers to a direction in parallel with a cell of the honeycomb fired body. However, even though a maximum length in a face constituted by end faces of the honeycomb fired bodies becomes longer than a length of a side face (direction in parallel with a cell) of the honeycomb fired body by piling up a large number of honeycomb fired bodies and bonding them to one another in a process for preparing the aggregated body of the honeycomb fired body, the direction in parallel with a cell of the honeycomb fired body is referred to as a longitudinal direction of the aggregated body of the honeycomb fired body or the honeycomb structured body.

Next, a sealing material layer (coat layer) 44 is formed on the periphery of the honeycomb block 43 thus prepared. Thereby, a honeycomb structured body formed by binding a plurality of honeycomb fired bodies by interposing a sealing material layer (adhesive layer) can be obtained.

Specifically, in the process for forming this sealing material layer (coat layer), first, a shaft of an aggregated body of the honeycomb fired body is rotatably supported in the longitudinal direction and the aggregated body of the honeycomb fired body is rotated. Subsequently, a sealing material paste is applied to the periphery of the aggregated body of the honeycomb fired body rotating to form a sealing material paste layer.

Here, a rotational speed of the aggregated body of the honeycomb fired body is not particularly limited but it is desirably at least about 2 $min^{-1}$ and at most about 10 $min^{-1}$.

By drying the sealing material paste layer thus formed at about 120° C., its water content is vaporized to form a sealing material layer (coat layer) 44, and a honeycomb structured body 40 shown in FIG. 4, in which the sealing material layer (coat layer) 44 is formed on the periphery of the honeycomb block 43, can be prepared.

In the manufacturing method of a honeycomb structured body according to the embodiments of the present invention, if necessary, the honeycomb structured body may support a catalyst thereafter.

The above-mentioned supporting of a catalyst may be applied to the honeycomb fired body prior to preparing the aggregated body of the honeycomb fired body. When the honeycomb structured body supports a catalyst, it is desirable that an alumina film having a high specific surface area is formed on the surface of the honeycomb structured body and a co-catalyst and a catalyst such as platinum and the like are provided for the surface of this alumina film.

With respect to the method for forming the alumina film on the surface of the honeycomb structured body, examples thereof may include: a method in which the honeycomb structured body is impregnated with a solution of a metal compound containing aluminum such as $Al(NO_3)_3$ and the like and then heated; a method in which the honeycomb structured body is impregnated with a solution containing alumina powder, and then heated; and the like.

With respect to the method for applying a catalyst to the alumina film, examples thereof may include a method in which the honeycomb structured body is impregnated with a solution of diamine dinitro platinum nitric acid ($[Pt(NH_3)_2(NO_2)_2]HNO_3$, platinum concentration: about 4.53% by weight) and the like and then heated, and the like.

Furthermore, the catalyst may be applied through a method in which a catalyst is applied to an alumina particle in advance, to impregnate the honeycomb structured body with a solution containing alumina powder applied with the catalyst, and heat it thereafter.

The manufacturing method of a honeycomb structured body according to the embodiments previously described are embodiments of the manufacturing method of an aggregated honeycomb structured body formed by binding a plurality of honeycomb fired bodies by interposing a sealing material layer (adhesive layer); however, a honeycomb structured body manufactured by the manufacturing method according to the embodiments of the present invention may be a integral honeycomb structured body comprising one cylindrical honeycomb fired body. Hereinafter, a manufacturing method of an integral honeycomb structured body will be described.

In addition, a principal component of a material of the honeycomb structured body is desirably silicon carbide, or silicon carbide and metal silicon in the aggregated honeycomb structured body, and desirably cordierite or aluminum titanate in the integral honeycomb structured body.

In order to manufacture the integral honeycomb structured body, first, a mixed composition is prepared by adding a binder and a dispersion medium to inorganic powder.

Examples of a method of preparing the mixed composition are not particularly limited and include, for example, the same preparing method of raw material paste as that described in the manufacturing method of the aggregated honeycomb structured body.

Next, the mixed composition is mixed with an attritor or the like, and kneaded well with a kneader or the like, and then a pillar-shaped honeycomb molded body is prepared by extrusion-molding and the like.

When the integral honeycomb structured body is manufactured, by preparing a honeycomb molded body to be molded by extrusion-molding, which is larger than that in manufacturing an aggregated honeycomb structured body, it is possible for the honeycomb structured body to exert necessary performance.

Next, after the honeycomb molded body is dried with a microwave dryer or the like, opening-sealing treatment, in which a plug material layer is formed at a specified cell of the dried honeycomb molded body, is applied. Examples of the plug material layer are not particularly limited and include, for example, materials similar to the above-mentioned mixed composition.

Next, the honeycomb molded body subjected to the opening-sealing treatment is dried again. In this drying process, the same drying process as that described in the manufacturing method of an aggregated honeycomb structured body can be carried out.

In addition, even if the integral honeycomb structured body has shapes such as a cylindrical pillar, a cylindroid, a square pillar and the like, it becomes easier to dry the honeycomb molded body efficiently by adapting a drying jig to such a shape.

Next, a honeycomb fired body made of porous ceramic is manufactured by degreasing and firing the honeycomb molded body under predetermined conditions.

When the shape of the honeycomb fired body is, for example, a square pillar shape as shown in FIG. 5A, the honeycomb structured body can be constructed from one honeycomb fired body by cutting the peripheral portion of the honeycomb fired body with a diamond cutter or the like.

Then, a sealing material layer (coat layer) is formed on the periphery of the honeycomb fired body thus manufactured. Examples of a method of forming this sealing material layer (coat layer) are not particularly limited and include, for example, the same method as that described in the manufacturing method of an aggregated honeycomb structured body. Thus, the integral honeycomb structured body can be manufactured.

Also, after the integral honeycomb structured body is manufactured, the catalyst for purifying exhaust gas may be supported, by using the manufacturing method of an aggregated honeycomb structured body.

The honeycomb structured body described in the present description is a honeycomb filter which captures particulates contained in exhaust gas. However, it can also be used as a catalyst supporting member (honeycomb catalyst) which is able to convert exhaust gas.

When the warpage and the like at the time of drying is prevented by holding the honeycomb molded body by a conventional drying jig or the like disclosed in JP-A 2001-130973, the drying jig holding the honeycomb molded body is only horizontally arranged in a dryer and therefore an improvement in work efficiency involves difficulties. For example, when the honeycomb molded body is dried in sequence with a microwave dryer and a hot-air dryer, since it takes much time to dry the honeycomb molded body through these dryers, this method is not suitable for the space saving and the efficiency improvement of a production line. Furthermore, even if a production line is automated using a belt conveyer or the like, working efficiency is hardly improved. Moreover, when the air velocity of hot-air is increased to shorten the drying time, there occurs a problem in which positional deviation of the drying jigs tend to occur upon multi-stage piling of the drying jigs, and inconveniences are caused to the honeycomb structured bodies held therein.

If the drying jig according to the embodiments of the present invention is piled up in multi stage in the process for drying, it becomes easier to enhance production efficiency and to realize space saving of a drying line. Moreover, it becomes unnecessary to increase the air velocity of hot-air in a hot-air drying process for the purpose of reducing the drying time; Thus, it becomes easier to prevent the displacement of the drying jig in the case of piling the drying jig in multi stage.

EXAMPLES

Hereinafter, the present invention will be described in more detail by way of examples, but the present invention is not limited to these examples.

Example 1

250 kg of α type silicon carbide powder having an average particle diameter of 10 μm, 100 kg of α type silicon carbide powder having an average particle diameter of 0.5 μm, and 20 kg of an organic binder (methyl cellulose) were mixed to prepare a mixed powder.

Next, separately, a liquid mixture was prepared by mixing 12 kg of a lubricant (UNILUB made by NOF Corp.), 5 kg of a plasticizer (glycerol) and 65 kg of water, and this liquid mixture and the mixed powder were mixed with a wet mixer to prepare a wet mixture.

Then, this wet mixture was subjected to extrusion-molding and subsequently cut to prepare a honeycomb molded body.

Next, the honeycomb molded body was dried with a dryer in which a microwave and a hot air were used in combination to reduce its water content by 40%.

Then, the honeycomb molded body, in which the water content was reduced by 40%, was held by a drying jig (made of epoxy resin) shown in FIG. 1, and was sent into a hot-air dryer having a configuration shown in FIG. 3 in a state of piling up this drying jig in two stages, and thus drying was carried out.

As drying conditions, there were used conditions of a dryer internal temperature 100° C., a hot-air velocity 50.0 m/sec and a dryer residence time 15 minutes.

Next, the honeycomb molded body subjected to the drying treatment was taken out of the drying jig, and a plug paste having the composition similar to that of the wet mixture was filled into a specified cell of the honeycomb molded body.

Next, after the honeycomb molded body was dried again with a dryer, the honeycomb molded body, into which the plug paste was filled, was degreased at 400° C. and was fired at 2200° C. for 3 hours in an atmosphere of argon gas of normal pressure to manufacture a honeycomb fired body having a porosity of 40%, an average pore diameter of 12.5 μm, a size of 34.3 mm×34.3 mm×150 mm, number of cells (cell density) of 46.5 pcs/cm$^2$ and a thickness of a cell wall of 0.25 mm, comprising a silicon carbide sintered body.

Example 2

A honeycomb fired body was manufactured by following the same procedure as in Example 1 except for drying the honeycomb molded body in a state of piling up the drying jig in three stages in drying treatment using a drying jig.

Reference Example 1

A honeycomb fired body was manufactured by following the same procedure as in Example 1 except for drying the honeycomb molded body in one stage without piling up the drying jig in drying treatment using a drying jig.

Example 3

80 kg of α type silicon carbide powder having an average particle diameter of 50 μm, 20 kg of silicon powder having an average particle diameter of 4 μm, and 11 kg of an organic binder (methyl cellulose) were mixed to prepare a mixed powder.

Next, separately, a liquid mixture was prepared by mixing 3.3 kg of a lubricant (UNILUB made by NOF Corp.), 1.5 kg of a plasticizer (glycerol) and a proper amount of water, and this liquid mixture and the mixed powder were mixed with a wet mixer to prepare a wet mixture.

Here, α type silicon carbide powder subjected to oxidation treatment at 800° C. for 3 hours was used as a type silicon carbide powder.

Then, this wet mixture was subjected to extrusion-molding and subsequently cut to prepare a honeycomb molded body.

Next, the honeycomb molded body was dried with a dryer in which a microwave and a hot air were used in combination to reduce its water content by 40%.

Then, the honeycomb molded body, in which the water content was reduced by 40%, was held by a drying jig (made of epoxy resin) shown in FIG. 1, and was sent into a hot-air dryer having a configuration shown in FIG. 3 in a state of piling up this drying jig in two stages, and thus drying was carried out.

As drying conditions, there were used conditions of a dryer internal temperature 100° C., a hot-air velocity 50.0 m/sec and a dryer residence time 15 minutes.

Next, the honeycomb molded body subjected to the drying treatment was taken out of the drying jig, and a plug paste having the composition similar to that of the wet mixture was filled into a specified cell of the honeycomb molded body.

Next, after the honeycomb molded body was dried again with a dryer, the honeycomb molded body, into which the plug paste was filled, was degreased at 400° C. and was fired at 2200° C. for 3 hours in an atmosphere of argon gas of normal pressure to manufacture a honeycomb fired body having a porosity of 45%, an average pore diameter of 20.0 μm, a size of 34.3 mm×34.3 mm×150 mm, number of cells (cell density) of 46.5 pcs/cm$^2$ and a thickness of a cell wall of 0.25 mm, comprising silicon-containing silicon carbide (Si—SiC).

Example 4

A honeycomb fired body was manufactured by following the same procedure as in Example 3 except for drying the honeycomb molded body in a state of piling up the drying jig in three stages in drying treatment using a drying jig.

Reference Example 2

A honeycomb fired body was manufactured by following the same procedure as in Example 3 except for drying the honeycomb molded body in one stage without piling up the drying jig in drying treatment using a drying jig.

An average porosity, an average pore diameter, a pressure loss, a particulate capturing amount and bending strength were measured on the honeycomb fired bodies manufactured in the examples and the reference examples, and consequently significant differences could not be found between honeycomb fired bodies manufactured in Examples 1, 2 and Reference Example 1, and between honeycomb fired bodies manufactured in Examples 3, 4 and Reference Example 2.

Accordingly, it is apparent that by using the drying jig according to the embodiments of the present invention, it becomes easier to carry out drying on the honeycomb molded body efficiently. By employing the manufacturing method of a honeycomb structured body according to the embodiments of the present invention, it becomes easier to improve the productivity of the honeycomb structured body.

Incidentally, measurement of the above-mentioned average porosity, average pore diameter, pressure loss, particulate capturing amount and bending strength were carried out according to the following methods.

(1) Average Porosity and Average Pore Diameter

A pore size distribution was measured in a pore diameter range of 0.1 to 360 μm according to mercury intrusion porosimetry to determine an average porosity and an average pore diameter, using a porosimeter (Auto Pore III 9405, manufactured by Shimadzu Corp.) based on mercury intrusion porosimetry.

(2) Pressure Loss and Particulate Capturing Amount

The honeycomb fired body was located at a passage of an engine exhaust as an exhaust gas purifying apparatus, the engine was operated for 100 minutes producing 50 Nm of torque at 3000 $min^{-1}$, and a pressure loss and a particulate capturing amount were measured.

(3) Bending Strength

A three-point bending test was carried out in the conditions of a bending span distance 135 mm and a bending speed 1 mm/min using Instron 5582 referring to JIS R 1601 to measure the bending strength of the honeycomb fired body.

The contents of JIS R 1601 are incorporated herein by reference in their entirety.

What is claimed as new and desired to be secured by Letters Patent of the United States is:

1. A drying device for a square pillar-shaped honeycomb molded body, comprising a plurality of drying jigs and a piling member,
   wherein each of the plurality of drying jigs comprises:
      an upper jig and a lower jig, wherein the upper jig and the lower jig are adapted to form an enclosure, the enclosure being adapted to substantially surround the honeycomb molded body and substantially cover a side face of the honeycomb molded body and being configured so that the longitudinal direction of said honeycomb molded body is held in the horizontal direction while opposite angles of a square shape in the cross-section perpendicular to the longitudinal direction of said honeycomb molded body are located on a same vertical line; and
      a fixing member for affixing the upper jig and the lower jig together to form the enclosure; and
   wherein the piling member is adapted to support one drying jig while being supported by another drying jig when more than one drying jigs are stacked, and the piling member comprises:
      a first V-shaped notch for engaging the lower jig of the drying jig, and
      a second V-shaped notch for engaging the upper jig of the drying jig, wherein a first vertex portion of the first V-shaped notch and a second vertex portion of the second V-shaped notch are substantially aligned along the vertical line.

2. The drying device according to claim 1, wherein the upper jig and the lower jig are completely detachable from each other.

3. The drying device according to claim 1, wherein the upper jig and the lower jig are affixed to the same fixing member while a portion of the upper jig is detachable from a portion of the lower jig.

4. The drying device according to claim 1, wherein said fixing member is affixed to the upper jig.

5. The drying device according to claim 1, wherein said drying jig comprises a material selected from the group consisting of epoxy resin, polycarbonate, polystyrene, polyethylene terephthalate, polyamideimide, and polyphenylene sulfide.

6. The drying device according to claim 1, further comprising an elastic member capable of absorbing water, the elastic member being interposed between said honeycomb molded body and the upper jig and/or the lower jig upon placing said honeycomb molded body in the enclosure of said drying jig.

7. A drying method of a square pillar-shaped honeycomb molded body, comprising:
   obtaining a plurality of drying jigs, each of the plurality of drying jigs comprising an upper jig, a lower jig, and a fixing member;
   affixing the upper jig and the lower jig together using at least one fixing member to form an enclosure in each of the plurality of drying jigs, the enclosure being adapted to substantially surround the honeycomb molded body and substantially cover a side face of the honeycomb molded body and being configured so that the longitudinal direction of said honeycomb molded body is held in the horizontal direction while opposite angles of a square shape in the cross-section perpendicular to the longitudinal direction of said honeycomb molded body are located on a same vertical line;
   placing one honeycomb molded body in the enclosure of each of the plurality of drying jigs;
   stacking the plurality of drying jigs vertically using at least one piling member so that the piling member supports one drying jig while being supported by another drying jig, wherein the piling member comprises
      a first V-shaped notch for engaging the lower jig of the drying jig, and
      a second V-shaped notch for engaging the upper jig of the drying jig, wherein a first vertex portion of the first V-shaped notch and a second vertex portion of the second V-shaped notch are substantially aligned along the vertical line; and
   placing the plurality of vertically stacked drying jigs inside a dryer for a predetermined period of time.

8. The drying method of a honeycomb molded body according to claim 7, wherein the upper jig and the lower jig are completely detachable from each other.

9. The drying method of a honeycomb molded body according to claim 7, wherein the upper jig and the lower jig are affixed to the same fixing member while a portion of the upper jig is detachable from a portion of the lower jig.

10. The drying method of a honeycomb molded body according to claim 7, wherein said fixing member is affixed to the upper jig.

11. The drying method of a honeycomb molded body according to claim 7, wherein said drying jig comprises a material selected from the group consisting of epoxy resin, polycarbonate, polystyrene, polyethylene terephthalate, polyamideimide, and polyphenylene sulfide.

12. The drying method of a honeycomb molded body according to claim 7, wherein said drying jig further comprises an elastic member capable of absorbing water, the elastic member being interposed between said honeycomb molded body and the upper jig and/or the lower jig when said honeycomb molded body is placed in the enclosure of said drying jig.

13. The drying method of a honeycomb molded body according to claim 7, further comprising microwave drying of said honeycomb molded body before placing said honeycomb molded body in the enclosure of said drying jig.

14. A manufacturing method of a honeycomb structured body, comprising:
    molding a ceramic material into a square pillar-shaped honeycomb molded;
    drying said honeycomb molded body using a drying device comprising a drying jig and a piling member, wherein the drying jig comprises an upper jig, a lower jig, and a fixing member; and
    firing said honeycomb molded body;
    wherein the drying of said honeycomb molded body further comprises:
    affixing the upper jig and the lower jig together using at least one fixing member to form an enclosure in the drying jig, the enclosure being adapted to substantially surround the honeycomb molded body and cover a side face of the honeycomb molded body and being configured so that the longitudinal direction of said honeycomb molded body is held in the horizontal direction while opposite angles of a square shape in the cross-section perpendicular to the longitudinal direction of said honeycomb molded body are located on a same vertical line; and
    placing the honeycomb molded body in the enclosure of the drying jig;
    stacking a plurality of drying jigs vertically using at least one piling member so that the piling member supports one drying jig while being supported by another drying jig, wherein the piling member comprises
        a first V-shaped notch for engaging the lower jig of the drying jig, and
        a second V-shaped notch for engaging the upper jig of the drying jig, wherein a first vertex portion of the first V-shaped notch and a second vertex portion of the second V-shaped notch are substantially aligned along the vertical line; and
    placing the plurality of vertically stacked drying jigs inside a dryer for a predetermined period of time.

15. The manufacturing method of a honeycomb structured body according to claim 14, wherein the upper jig and the lower jig are completely detachable from each other.

16. The manufacturing method of a honeycomb structured body according to claim 14, wherein the upper jig and the lower jig are affixed to the same fixing member while a portion of the upper jig is detachable from a portion of the lower jig.

17. The manufacturing method of a honeycomb structured body according to claim 14, wherein said fixing member is affixed to the upper jig.

18. The manufacturing method of a honeycomb structured body according to claim 14, wherein said drying jig comprises a material selected from the group consisting of epoxy resin, polycarbonate, polystyrene, polyethylene terephthalate, polyamideimide, and polyphenylene sulfide.

19. The manufacturing method of a honeycomb structured body according to claim 14, wherein said drying jig further comprises an elastic member which can absorb water, the elastic member being interposed between said honeycomb molded body and the upper jig and/or the lower jig when said honeycomb molded body is placed in the enclosure of said drying jig.

20. The manufacturing method of a honeycomb structured body according to claim 14, further comprising microwave drying of said honeycomb molded body before placing said honeycomb molded body in the enclosure of said drying jig.

21. The manufacturing method of a honeycomb structured body according to claim 14, wherein said honeycomb structured body has a structure in which a plurality of honeycomb fired bodies are bound to one another by interposing a sealing material layer between adjacent honeycomb fired bodies.

22. The manufacturing method of a honeycomb structured body according to claim 14, wherein said honeycomb structured body comprises a single honeycomb fired body.

* * * * *